United States Patent
Inoue et al.

(10) Patent No.: US 12,215,268 B2
(45) Date of Patent: Feb. 4, 2025

(54) DYE COMPOUND-CONTAINING LIQUID CRYSTAL COMPOSITION AND DEVICE INCLUDING THE SAME

(71) Applicant: DIC Corporation, Tokyo (JP)

(72) Inventors: Yuichi Inoue, Saitama (JP); Daiki Noro, Saitama (JP); Junichi Mamiya, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 18/281,306

(22) PCT Filed: Mar. 10, 2022

(86) PCT No.: PCT/JP2022/010457
§ 371 (c)(1),
(2) Date: Sep. 11, 2023

(87) PCT Pub. No.: WO2022/202349
PCT Pub. Date: Sep. 29, 2022

(65) Prior Publication Data
US 2024/0174925 A1 May 30, 2024

(30) Foreign Application Priority Data
Mar. 25, 2021 (JP) .................... 2021-051440

(51) Int. Cl.
| | |
|---|---|
| *G02F 1/1333* | (2006.01) |
| *C09K 19/14* | (2006.01) |
| *C09K 19/20* | (2006.01) |
| *C09K 19/30* | (2006.01) |
| *C09K 19/34* | (2006.01) |
| *C09K 19/58* | (2006.01) |
| *C09K 19/60* | (2006.01) |

(52) U.S. Cl.
CPC .............. *C09K 19/58* (2013.01); *C09K 19/14* (2013.01); *C09K 19/20* (2013.01); *C09K 19/3001* (2013.01); *C09K 19/3458* (2013.01); *C09K 19/60* (2013.01)

(58) Field of Classification Search
CPC ........ C09K 19/58; C09K 19/14; C09K 19/20; C09K 19/3001; C09K 19/3458; C09K 19/60; C09K 2019/123; C09K 2019/3004; C09K 2019/3009; C09K 2019/301; C09K 2019/3016; G02F 1/1333
See application file for complete search history.

(56) References Cited

U.S. PATENT DOCUMENTS

| | | |
|---|---|---|
| 6,613,401 B2 | 9/2003 | Hirschmann et al. |
| 7,001,646 B2 | 2/2006 | Heckmeier et al. |
| 7,390,538 B2 | 6/2008 | Manabe et al. |
| 9,994,770 B2 | 6/2018 | Tanaka et al. |
| 10,260,001 B2 | 4/2019 | Junge et al. |
| 11,168,257 B2 | 11/2021 | Kirsch et al. |
| 11,174,431 B2 | 11/2021 | Ohishi et al. |
| 2019/0153320 A1* | 5/2019 | Kirsch ............... C09K 19/3003 |
| 2019/0256773 A1 | 8/2019 | Matsuda et al. |
| 2024/0174925 A1* | 5/2024 | Inoue .................... C09K 19/14 |

FOREIGN PATENT DOCUMENTS

| | | |
|---|---|---|
| CN | 110325621 | 10/2019 |
| JP | 2002180050 | 6/2002 |
| JP | 2003518154 | 6/2003 |
| JP | 2007526931 | 9/2007 |
| JP | 2017513975 | 6/2017 |
| JP | 2017165710 | 9/2017 |
| JP | 2019085581 | 6/2019 |
| JP | 2019527748 | 10/2019 |
| WO | 2017038616 | 3/2017 |
| WO | 2018078968 | 5/2018 |
| WO | 2018159303 | 9/2018 |
| WO | 2019243216 | 12/2019 |

* cited by examiner

*Primary Examiner* — Geraldina Visconti
(74) *Attorney, Agent, or Firm* — JCIPRNET

(57) ABSTRACT

An object of the present invention is to provide a dye compound-containing liquid crystal composition that has high solubility and high solubility retention for the dye compound and has high light resistance and a device including the composition. The use of a combination of one or two or more predetermined alkenyl compounds and a compound including a predetermined difluoro structure can provide a dye compound-containing liquid crystal composition that has high solubility and high solubility retention for the dye compound and has high light resistance, and the dye compound-containing liquid crystal composition is useful for devices, in particular, photochromic devices.

9 Claims, No Drawings

DYE COMPOUND-CONTAINING LIQUID CRYSTAL COMPOSITION AND DEVICE INCLUDING THE SAME

CROSS-REFERENCE TO RELATED APPLICATION

This application is a 371 application of an international PCT application serial no. PCT/JP2022/010457, filed on Mar. 10, 2022, which claims the priority benefit of Japan application JP2021-051440, filed on Mar. 25, 2021. The entirety of the above-mentioned patent application is hereby incorporated by reference herein and made a part of this specification.

TECHNICAL FIELD

The present invention relates to a dye compound-containing liquid crystal composition and a device including the composition.

BACKGROUND ART

Liquid crystal materials, which are used in various display devices configured to display characters, pictures, and images and represented by TVs or smartphones, are also being put into practical use in terms of use as photochromic devices configured to control transmission of light.

In particular, in the case of using "guest-host (GH)-type liquid crystal compositions" prepared by adding dye compounds to host liquid crystal compositions, the necessity of using a polarizing plate is eliminated, to thereby provide, at low costs, photochromic devices having high transmittance, which are considered as promising.

The GH-type liquid crystal compositions have been studied for a long time and attempts to develop liquid crystal display devices or photochromic devices having predetermined performance (for example, high contrast, high solubility for liquid crystal compositions and dye compounds, high light resistance, or high heat resistance) have been performed (Patent Literatures 1 to 4).

CITATION LIST

Patent Literature

PTL 1: International Publication No. 2017/038616
PTL 2: Japanese Unexamined Patent Application Publication No. 2019-85581
PTL 3: International Publication No. 2018/078968
PTL 4: Japanese Unexamined Patent Application Publication (Translation of PCT Application) No. 2017-513975

SUMMARY OF INVENTION

Technical Problem

However, for liquid crystal compositions containing dye compounds, higher performance (such as high contrast, high solubility for liquid crystal compositions and dye compounds, high light resistance, or high heat resistance) has been in demand and the inventions in PTLs 1 to 4 have room for further improvement.

An object of the present invention is to provide a dye compound-containing liquid crystal composition that has high solubility and high solubility retention for the dye compound and has high light resistance, and a device including the composition.

Solution to Problem

The inventors of the present invention have found that use of a combination of one or two or more predetermined alkenyl compounds and a compound including a predetermined difluoro structure can achieve the above-described object and have accomplished the present invention.

Features of the present invention that achieve the above-described object are as follows.

A dye compound-containing liquid crystal composition according to the present invention includes:
one or two or more compounds represented by a general formula (i) below:

[Chem. 1]

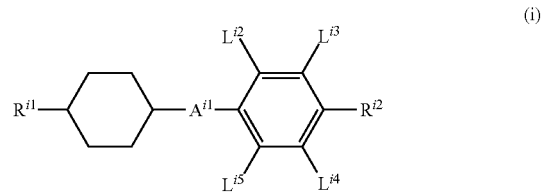

(i)

(in the general formula (i),
$R^{i1}$ represents an alkenyl group having 2 to 20 carbon atoms,
in the alkenyl group, one or two or more —$CH_2$— may each independently be substituted with —O— and/or —CO—,
in the alkenyl group, one or two or more —$CH_2$—$CH_2$— may each independently be substituted with —CH=CH— and/or —C≡C—,
in the alkenyl group, one or two or more hydrogen atoms may each independently be substituted with a halogen atom,
with the proviso that no direct bond between an oxygen atom and an oxygen atom is formed,
$R^{i2}$ represents an alkyl group having 1 to 20 carbon atoms,
in the alkyl group, one or two or more —$CH_2$— may each independently be substituted with —O— and/or —CO—,
in the alkyl group, one or two or more —$CH_2$—$CH_2$— may each independently be substituted with —CH=CH— and/or —C≡C—,
in the alkyl group, one or two or more hydrogen atoms may each independently be substituted with a halogen atom,
with the proviso that no direct bond between an oxygen atom and an oxygen atom is formed,
$A^{i1}$ represents a group selected from the group consisting of a group (a) and a group (b) below:
(a) a 1,4-cyclohexylene group (in this group, one —$CH_2$— or non-adjacent two or more —$CH_2$— may be replaced by —O— and/or —S—), and
(b) a 1,4-phenylene group (in this group, one —CH= or non-adjacent two or more —CH= may be replaced by —N=),
in $A^{i1}$ above, one or two or more hydrogen atoms may each independently be substituted with a halogen atom, and $L^{i2}$, $L^{i3}$, $L^{i4}$, and $L^{i5}$ each independently represent a hydrogen atom or a halogen atom);

one or two or more compounds represented by a general formula (ii) below:

[Chem. 2]

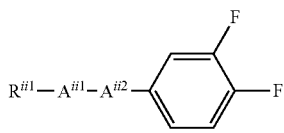

(ii)

(in the general formula (ii), $R^{ii1}$ represents an alkyl group having 1 to 20 carbon atoms, in the alkyl group, one or two or more —$CH_2$— may each independently be substituted with —O— and/or —CO—, in the alkyl group, one or two or more —$CH_2$—$CH_2$— may each independently be substituted with —CH=CH— and/or —C≡C—, in the alkyl group, one or two or more hydrogen atoms may each independently be substituted with a halogen atom, with the proviso that no direct bond between an oxygen atom and an oxygen atom is formed, $A^{ii1}$ and $A^{ii2}$ each independently represent a group selected from the group consisting of a group (a) and a group (b) below:

(a) a 1,4-cyclohexylene group (in this group, one —$CH_2$— or non-adjacent two or more —$CH_2$— may be replaced by —O— and/or —S—), and (b) a 1,4-phenylene group (in this group, one —CH= or non-adjacent two or more —CH= may be replaced by —N=), and in $A^{ii1}$ and $A^{ii2}$ above, one or two or more hydrogen atoms may each independently be substituted with a halogen atom); and one or two or more dye compounds.

A device according to the present invention includes the above-described dye compound-containing liquid crystal composition.

Advantageous Effects of Invention

According to the present invention, use of a combination of one or two or more predetermined alkenyl compounds and a compound including a predetermined difluoro structure can provide a dye compound-containing liquid crystal composition that has high solubility and high solubility retention for the dye compound and has high light resistance, and the dye compound-containing liquid crystal composition is useful for devices, in particular, photochromic devices.

More specifically, a dye compound-containing liquid crystal composition according to the present invention in which deposition of the dye compound can be prevented even at a temperature as low as −25° C. can be used in wide temperature ranges.

Furthermore, it has high light resistance and undergoes less change in coloration.

Therefore, it can be applied to on-vehicle applications in which suitability to harsh environments is a priority, applications of mobile terminals such as smartphones and tablets, and applications of photochromic devices such as windowpanes, for example.

DESCRIPTION OF EMBODIMENTS (Compound Represented by General Formula (i))

A dye compound-containing liquid crystal composition according to the present invention includes one or two or more alkenyl compounds represented by the following general formula (i).

[Chem. 3]

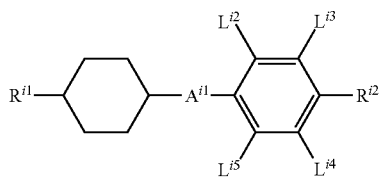

(i)

In the general formula (i), $R^{i1}$ represents an alkenyl group having 2 to 20 carbon atoms.

The alkenyl group having 2 to 20 carbon atoms is a linear, branched, or cyclic alkenyl group and is preferably a linear alkenyl group.

In the alkenyl group having 2 to 20 carbon atoms, the number of carbon atoms is preferably 2 to 10, preferably 2 to 6.

In the alkenyl group, one or two or more —$CH_2$— may each independently be substituted with —O— and/or —CO—.

In the alkenyl group, one or two or more —$CH_2$—$CH_2$— may each independently be substituted with —CH=CH— and/or —C≡C—.

In the alkenyl group, one or two or more hydrogen atoms may each independently be substituted with a halogen atom.

Examples of the halogen atom include a fluorine atom, a chlorine atom, and a bromine atom.

Note that, when the alkenyl group is substituted with a predetermined group, no direct bond between an oxygen atom and an oxygen atom is formed.

For example, $R^{i1}$ in which, in the alkenyl group, one —$CH_2$— is substituted with —O— can represent an alkenyloxy group having 2 to 19 carbon atoms.

The alkenyloxy group is a linear, branched, or cyclic alkenyloxy group and is preferably a linear alkenyloxy group.

In the alkenyloxy group, the number of carbon atoms is preferably 2 to 10, preferably 2 to 6.

In $R^{i1}$, specific examples of the alkenyl group having 2 to 20 carbon atoms (including substituted groups) include groups represented by formulas ($R^{i1}$-1) to ($R^{i1}$-10).

[Chem. 4]

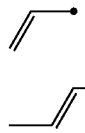

($R^{i1}$-1)

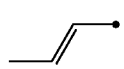

($R^{i1}$-2)

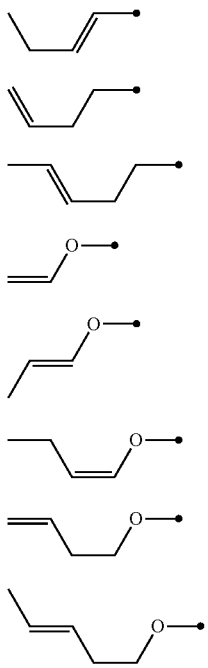

In the formulas ($R^{i1}$-1) to ($R^{i1}$-10), the black dots represent points of attachment to the cyclic structure.

Note that $R^{i1}$ is, from the viewpoint of improving the solubility for the dye compound, preferably a linear alkenyl group having 2 to 6 carbon atoms.

In the general formula (i), $R^{i2}$ represents an alkyl group having 1 to 20 carbon atoms.

The alkyl group having 1 to 20 carbon atoms is a linear, branched, or cyclic alkyl group and is preferably a linear alkyl group.

In the alkyl group having 1 to 20 carbon atoms, the number of carbon atoms is preferably 2 to 10, preferably 2 to 6.

In the alkyl group, one or two or more —CH$_2$— may each independently be substituted with —O— and/or —CO—.

In the alkyl group, one or two or more —CH$_2$—CH$_2$— may each independently be substituted with —CH=CH— and/or —C≡C—.

In the alkyl group, one or two or more hydrogen atoms may each independently be substituted with a halogen atom.

Examples of the halogen atom include a fluorine atom, a chlorine atom, and a bromine atom.

Note that, when the alkyl group is substituted with a predetermined group, no direct bond between an oxygen atom and an oxygen atom is formed.

For example, $R^{i2}$ in which, in the alkyl group, one —CH$_2$— is substituted with —O— can represent an alkoxy group having 1 to 19 carbon atoms.

The alkoxy group is a linear, branched, or cyclic alkoxy group and is preferably a linear alkoxy group.

In the alkoxy group, the number of carbon atoms is preferably 2 to 10, preferably 2 to 6.

$R^{i2}$ in which, in the alkyl group, one or two or more —CH$_2$—CH$_2$— are substituted with —CH=CH— can represent an alkenyl group having 1 to 20 carbon atoms.

The alkenyl group is a linear, branched, or cyclic alkenyl group and is preferably a linear alkenyl group.

In the alkenyl group, the number of carbon atoms is preferably 2 to 10, preferably 2 to 6.

$R^{i2}$ in which, in the alkyl group, one or two or more —CH$_2$—CH$_2$— are substituted with —C≡C— can represent an alkynyl group having 1 to 20 carbon atoms.

The alkynyl group is a linear, branched, or cyclic alkynyl group and is preferably a linear alkynyl group.

In the alkynyl group, the number of carbon atoms is preferably 2 to 10, preferably 2 to 6.

$R^{i2}$ in which, in the alkyl group, one —CH$_2$— is substituted with —O— and one or two or more —CH$_2$—CH$_2$— are substituted with —CH=CH— can represent an alkenyloxy group having 1 to 19 carbon atoms.

The alkenyloxy group is a linear, branched, or cyclic alkenyloxy group and is preferably a linear alkenyloxy group.

In the alkenyloxy group, the number of carbon atoms is preferably 2 to 10, preferably 2 to 6.

$R^{i2}$ in which, in the alkyl group, one or two or more hydrogen atoms are substituted with halogen atoms can represent a halogenated alkyl group having 1 to 20 carbon atoms.

The halogenated alkyl group is a linear, branched, or cyclic halogenated alkyl group and is preferably a linear halogenated alkyl group.

In the halogenated alkyl group, the number of carbon atoms is preferably 2 to 10, preferably 2 to 6.

In $R^{i2}$, specific examples of the alkyl group having 1 to 20 carbon atoms (including substituted groups) include groups represented by formulas ($R^{i2}$-1) to ($R^{i2}$-31).

[Chem. 5]

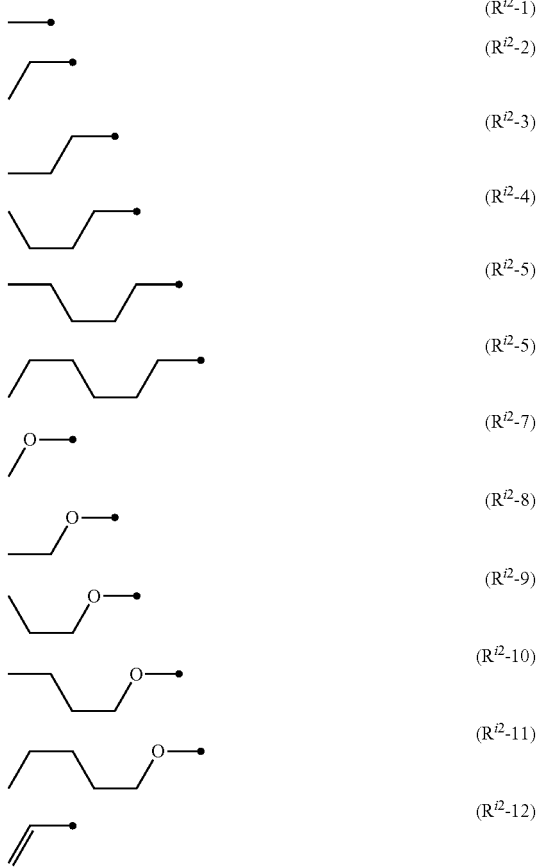

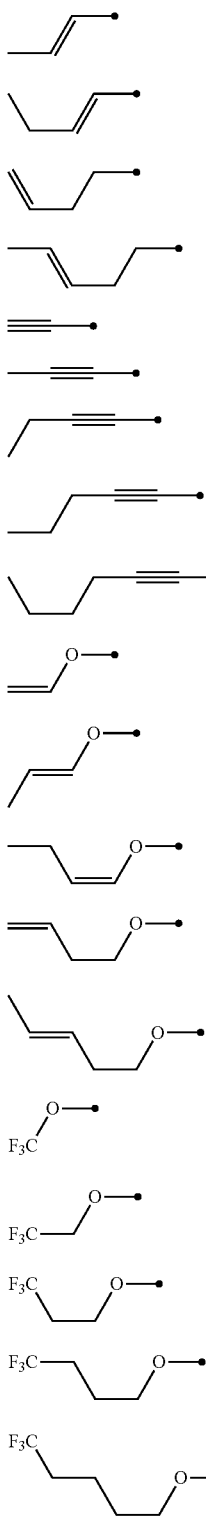

(R$^{i2}$-13)
(R$^{i2}$-14)
(R$^{i2}$-15)
(R$^{i2}$-16)
(R$^{i2}$-17)
(R$^{i2}$-18)
(R$^{i2}$-19)
(R$^{i2}$-20)
(R$^{i2}$-21)
(R$^{i2}$-22)
(R$^{i2}$-23)
(R$^{i2}$-24)
(R$^{i2}$-25)
(R$^{i2}$-26)
(R$^{i2}$-27)
(R$^{i2}$-28)
(R$^{i2}$-29)
(R$^{i2}$-30)
(R$^{i2}$-31)

In the formulas (R$^{i2}$-1) to (R$^{i2}$-31), the black dots represent points of attachment to the cyclic structure.

Note that R$^{i2}$ is, from the viewpoint of providing high solubility and decreasing the viscosity of the dye compound-containing liquid crystal composition, preferably a linear alkyl group having 1 to 6 carbon atoms.

In the general formula (i), A$^{i1}$ represents a group selected from the group consisting of the following group (a) and group (b):

(a) a 1,4-cyclohexylene group (in this group, one —CH$_2$— or non-adjacent two or more —CH$_2$— may be replaced by —O— and/or —S—), and (b) a 1,4-phenylene group (in this group, one —CH= or non-adjacent two or more —CH= may be replaced by —N=).

In A$^{i1}$, one or two or more hydrogen atoms may each independently be substituted with a halogen atom.

Examples of the halogen atom include a fluorine atom, a chlorine atom, a bromine atom, and an iodine atom.

More specifically, A$^{i1}$ preferably represents any one of the following formulas (A$^{i1}$-1) to (A$^{i1}$-2).

[Chem. 6]

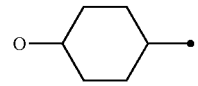

(A$^{i1}$-1)

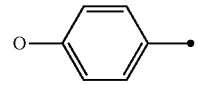

(A$^{i1}$-2)

In the formulas (A$^{i1}$-1) to (A$^{i1}$-2), the white dots represent points of attachment to the 1,4-cyclohexylene group and the black dots represent points of attachment to the 1,4-phenylene group.

In the general formula (i), L$^{i2}$, L$^{i3}$, L$^{i4}$, and L$^{i5}$ each independently represent a hydrogen atom or a halogen atom.

Examples of the halogen atom include a fluorine atom, a chlorine atom, a bromine atom, and an iodine atom.

From the viewpoint of providing a dye compound-containing liquid crystal composition having high light resistance, L$^{i2}$, L$^{i3}$, L$^{i4}$, and L$^{i5}$ are all preferably hydrogen atoms.

The compound represented by the general formula (i) is preferably compounds represented by the following general formulas (i-1) to (i-2).

[Chem. 7]

(i-1)

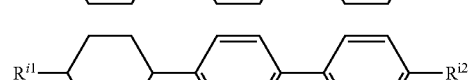

(i-2)

In the general formulas (i-1) to (i-2), R$^{i1}$ and R$^{i2}$ respectively have the same meanings and preferred groups as R$^{i1}$ and R$^{i2}$ in the above-described general formula (i).

The compound represented by the general formula (i-1) is preferably compounds represented by the following structural formulas (i-1.1) to (i-1.8).

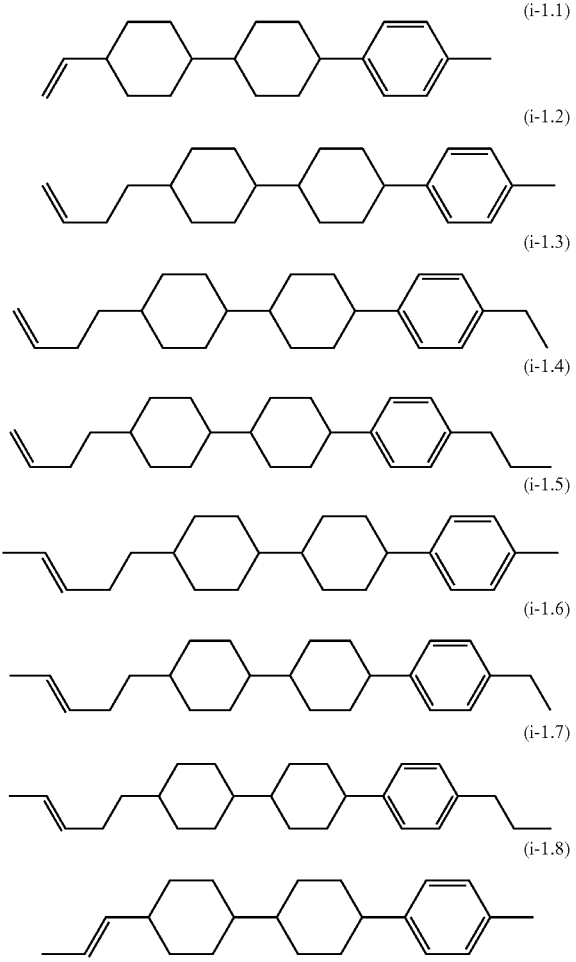

(i-1.1)
(i-1.2)
(i-1.3)
(i-1.4)
(i-1.5)
(i-1.6)
(i-1.7)
(i-1.8)

The compound represented by the general formula (i-2) is preferably compounds represented by the following structural formulas (i-2.1) to (i-2.2).

[Chem. 9]

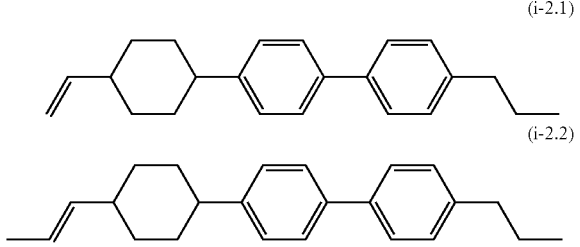

(i-2.1)
(i-2.2)

For the compounds represented by the general formula (i), the general formulas (i-1 to (i-2), the structural formulas (i-1.1) to (i-1.8), and the structural formulas (i-2.1) to (i-2.2), the number of compounds used in the dye compound-containing liquid crystal composition is 1 or 2 or more, preferably 1 to 5, preferably 1 to 4, preferably 1 to 3, preferably 1 to 2, preferably 1.

The lower limit value of the total content of the compounds represented by the general formula (i), the general formulas (i-1) to (i-2), the structural formulas (i-1.1) to (i-1.8), and the structural formulas (i-2.1) to (i-2.2) relative to 100 mass % of the dye compound-containing liquid crystal composition is preferably 1 mass % or more, preferably 5 mass % or more, preferably 10 mass % or more.

The upper limit value of the total content of the compounds represented by the general formula (i), the general formulas (i-1) to (i-2), the structural formulas (i-1.1) to (i-1.8), and the structural formulas (i-2.1) to (i-2.2) relative to 100 mass % of the dye compound-containing liquid crystal composition is preferably 35 mass % or less, preferably 30 mass % or less, preferably 25 mass % or less.

The total content of the compounds represented by the general formula (i), the general formulas (i-1) to (i-2), the structural formulas (i-1.1) to (i-1.8), and the structural formulas (i-2.1) to (i-2.2) relative to 100 mass % of the dye compound-containing liquid crystal composition is preferably 1 to 35 mass %, preferably 5 to 30 mass %, preferably 10 to 25 mass %.

The compounds represented by the general formula (i), the general formulas (i-1) to (i-2), the structural formulas (i-1.1) to (i-1.8), and the structural formulas (i-2.1) to (i-2.2) can be synthesized by publicly known synthesis methods.

(Compound Represented by General Formula (ii))

A dye compound-containing liquid crystal composition according to the present invention includes one or two or more compounds represented by the following general formula (ii) and including a difluoro structure.

[Chem. 10]

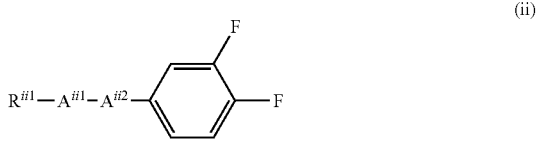

(ii)

In the general formula (ii), $R^{ii1}$ represents an alkyl group having 1 to 20 carbon atoms.

The alkyl group having 1 to 20 carbon atoms is a linear, branched, or cyclic alkyl group and is preferably a linear alkyl group.

In the alkyl group having 1 to 20 carbon atoms, the number of carbon atoms is preferably 2 to 10, preferably 2 to 6.

In the alkyl group, one or two or more —$CH_2$— may each independently be substituted with —O— and/or —CO—.

In the alkyl group, one or two or more —$CH_2$—$CH_2$— may each independently be substituted with —CH=CH— and/or —C≡C—.

In the alkyl group, one or two or more hydrogen atoms may each independently be substituted with a halogen atom.

Examples of the halogen atom include a fluorine atom, a chlorine atom, and a bromine atom.

Note that, when the alkyl group is substituted with a predetermined group, no direct bond between an oxygen atom and an oxygen atom is formed.

For example, $R^{ii1}$ in which, in the alkyl group, one —$CH_2$— is substituted with —O— can represent an alkoxy group having 1 to 19 carbon atoms.

The alkoxy group is a linear, branched, or cyclic alkoxy group and is preferably a linear alkoxy group.

In the alkoxy group, the number of carbon atoms is preferably 2 to 10, preferably 2 to 6.

$R^{ii1}$ in which, in the alkyl group, one or two or more —CH$_2$—CH$_2$— are substituted with —CH=CH— can represent an alkenyl group having 1 to 20 carbon atoms.

The alkenyl group is a linear, branched, or cyclic alkenyl group and is preferably a linear alkenyl group.

In the alkenyl group, the number of carbon atoms is preferably 2 to 10, preferably 2 to 6.

$R^{ii1}$ in which, in the alkyl group, one or two or more —CH$_2$—CH$_2$— is substituted with —C≡C— can represent an alkynyl group having 1 to 20 carbon atoms.

The alkynyl group is a linear, branched, or cyclic alkynyl group and is preferably a linear alkynyl group.

In the alkynyl group, the number of carbon atoms is preferably 2 to 10, preferably 2 to 6.

$R^{ii1}$ in which, in the alkyl group, one —CH$_2$— is substituted with —O— and one or two or more —CH$_2$—CH$_2$— are substituted with —CH=CH— can represent an alkenyloxy group having 1 to 19 carbon atoms.

The alkenyloxy group is a linear, branched, or cyclic alkenyloxy group and is preferably a linear alkenyloxy group.

In the alkenyloxy group, the number of carbon atoms is preferably 2 to 10, preferably 2 to 6.

$R^{ii1}$ in which, in the alkyl group, one or two or more hydrogen atoms are substituted with halogen atoms can represent a halogenated alkyl group having 1 to 20 carbon atoms.

The halogenated alkyl group is a linear, branched, or cyclic halogenated alkyl group and is preferably a linear halogenated alkyl group.

In the halogenated alkyl group, the number of carbon atoms is preferably 2 to 10, preferably 2 to 6.

In $R^{ii1}$, specific examples of the alkyl group having 1 to 20 carbon atoms (including substituted groups) include groups represented by formulas ($R^{ii1}$-1) to ($R^{ii1}$-31).

[Chem. 11]

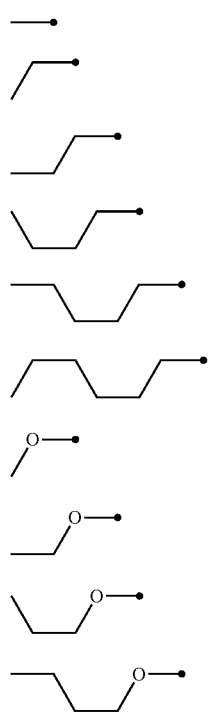

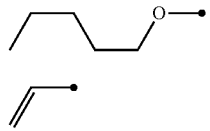
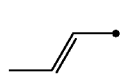
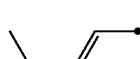
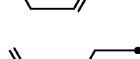
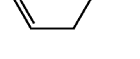
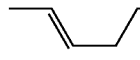
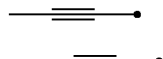
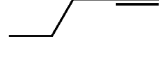
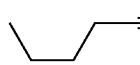
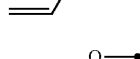
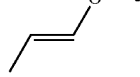
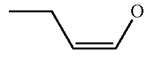
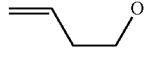
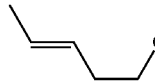
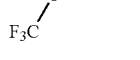
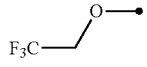
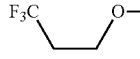
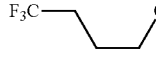

In the formulas ($R^{ii1}$-1) to ($R^{ii1}$-31), the black dots represent points of attachment to the cyclic structure.

Note that $R^{ii1}$ is, from the viewpoint of providing high solubility and decreasing the viscosity of the dye compound-containing liquid crystal composition, preferably a linear alkyl group having 1 to 6 carbon atoms or a linear alkenyl group having 1 to 6 carbon atoms.

In the general formula (ii), $A^{ii1}$ and $A^{ii2}$ each independently represent a group selected from the group consisting of the following group (a) and group (b):
(a) a 1,4-cyclohexylene group (in this group, one —$CH_2$— or non-adjacent two or more —$CH_2$— may be replaced by —O— and/or —S—), and
(b) a 1,4-phenylene group (in this group, one —CH= or non-adjacent two or more —CH= may be replaced by —N=).

In $A^{ii1}$ and $A^{ii2}$, one or two or more hydrogen atoms may each independently be substituted with a halogen atom.

Examples of the halogen atom include a fluorine atom, a chlorine atom, a bromine atom, and an iodine atom.

More specifically, $A^{ii1}$ and $A^{ii2}$ preferably represent any one of the following formulas ($A^{ii1/2}$-1) to ($A^{ii1/2}$-2)

[Chem. 12]

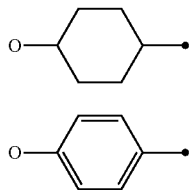

In the formulas ($A^{ii1/2}$-1) to ($A^{ii1/2}$-2), the white dots represent points of attachment to $R^{ii1}$ or $A^{ii1}$ and the black dots represent points of attachment to $A^{ii2}$ or the (3F)-1,4-phenylene group.

The compound represented by the general formula (ii) is preferably compounds represented by the following general formulas (ii-1) to (ii-3).

[Chem. 13]

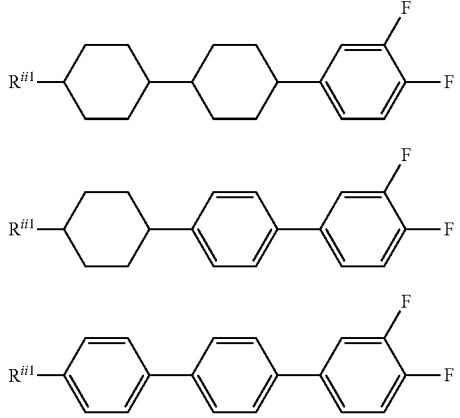

In the general formula (ii-1) to the general formula (ii-3), $R^{ii1}$'s each have the same meaning and preferred groups as $R^{ii1}$ in the above-described general formula (ii).

The compound represented by the general formula (ii-1) is preferably compounds represented by the following structural formulas (ii-1.1) to (ii-1.4).

[Chem. 14]

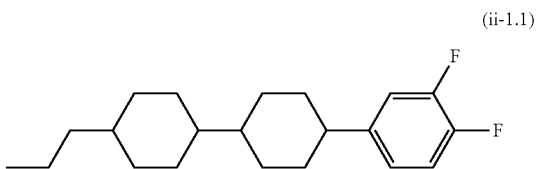

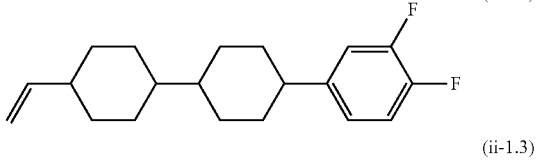

The compound represented by the general formula (ii-2) is preferably compounds represented by the following structural formulas (ii-2.1) to (ii-2.4).

[Chem. 15]

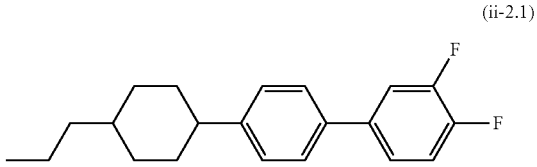

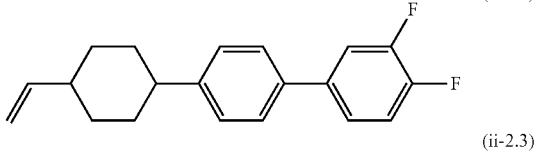

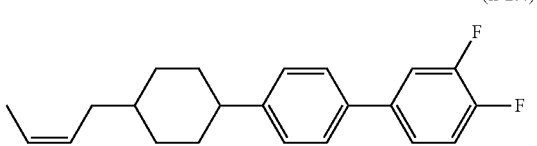

The compound represented by the general formula (ii-3) is preferably compounds represented by the following structural formulas (ii-3.1) to (ii-3.4).

[Chem. 16]

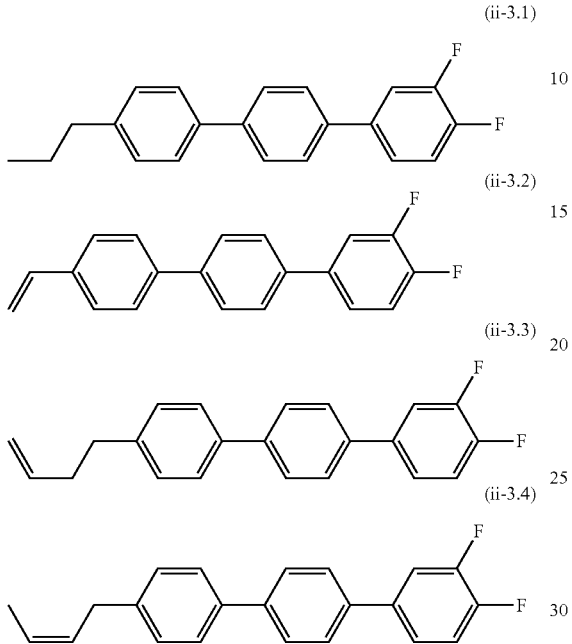

For the compounds represented by the general formula (ii), the general formulas (ii-1) to (ii-3), the structural formulas (ii-1.1) to (ii-1.4), the structural formulas (ii-2.1) to (ii-2.4), and the structural formulas (ii-3.1) to (ii-3.4), the number of compounds used in the dye compound-containing liquid crystal composition is 1 or 2 or more, preferably 1 to 5, preferably 1 to 4, preferably 1 to 3, preferably 1 to 2.

The lower limit value of the total content of the compounds represented by the general formula (ii), the general formulas (ii-1) to (ii-3), the structural formulas (ii-1.1) to (ii-1.4), the structural formulas (ii-2.1) to (ii-2.4), and the structural formulas (ii-3.1) to (ii-3.4) relative to 100 mass % of the dye compound-containing liquid crystal composition is preferably 1 mass % or more, preferably 5 mass % or more, preferably 10 mass % or more.

The upper limit value of the total content of the compounds represented by the general formula (ii), the general formulas (ii-1) to (ii-3), the structural formulas (ii-1.1) to (ii-1.4), the structural formulas (ii-2.1) to (ii-2.4), and the structural formulas (ii-3.1) to (ii-3.4) relative to 100 mass % of the dye compound-containing liquid crystal composition is preferably 30 mass % or less, preferably 25 mass % or less, preferably 20 mass % or less.

The total content of the compounds represented by the general formula (ii), the general formulas (ii-1) to (ii-3), the structural formulas (ii-1.1) to (ii-1.4), the structural formulas (ii-2.1) to (ii-2.4), and the structural formulas (ii-3.1) to (ii-3.4) relative to 100 mass % of the dye compound-containing liquid crystal composition is preferably 1 to 30 mass %, preferably 5 to 25 mass %, preferably 10 to 20 mass %.

The compounds represented by the general formula (ii), the general formulas (ii-1) to (ii-3), the structural formulas (ii-1.1) to (ii-1.4), the structural formulas (ii-2.1) to (ii-2.4), and the structural formulas (ii-3.1) to (ii-3.4) can be synthesized by publicly known synthesis methods.

(Other Compounds)
(Compound Represented by General Formula (iii))

A dye compound-containing liquid crystal composition according to the present invention, from the viewpoint of further increasing the dielectric anisotropy of the dye compound-containing liquid crystal composition, may further include one or two or more compounds represented by the following general formula (iii) and including a trifluoro structure.

[Chem. 17]

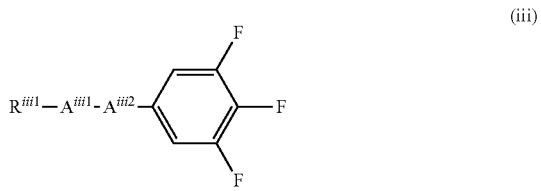

In the general formula (iii), $R^{iii1}$ represents an alkyl group having 1 to 20 carbon atoms.

The alkyl group having 1 to 20 carbon atoms is a linear, branched, or cyclic alkyl group and is preferably a linear alkyl group.

In the alkyl group having 1 to 20 carbon atoms, the number of carbon atoms is preferably 2 to 10, preferably 2 to 6.

In the alkyl group, one or two or more —$CH_2$— may each independently be substituted with —O— and/or —CO—.

In the alkyl group, one or two or more —$CH_2$—$CH_2$— may each independently be substituted with —CH=CH— and/or —C≡C—.

In the alkyl group, one or two or more hydrogen atoms may each independently be substituted with a halogen atom.

Examples of the halogen atom include a fluorine atom, a chlorine atom, and a bromine atom.

Note that, when the alkyl group is substituted with a predetermined group, no direct bond between an oxygen atom and an oxygen atom is formed.

For example, $R^{iii1}$ in which, in the alkyl group, one —$CH_2$— is substituted with —O— can represent an alkoxy group having 1 to 19 carbon atoms.

The alkoxy group is a linear, branched, or cyclic alkoxy group and is preferably a linear alkoxy group.

In the alkoxy group, the number of carbon atoms is preferably 2 to 10, preferably 2 to 6.

$R^{iii1}$ in which, in the alkyl group, one or two or more —$CH_2$—$CH_2$— are substituted with —CH=CH— can represent an alkenyl group having 1 to 20 carbon atoms.

The alkenyl group is a linear, branched, or cyclic alkenyl group and is preferably a linear alkenyl group.

In the alkenyl group, the number of carbon atoms is preferably 2 to 10, preferably 2 to 6.

$R^{iii1}$ in which, in the alkyl group, one or two or more —$CH_2$—$CH_2$— are substituted with —C≡C— can represent an alkynyl group having 1 to 20 carbon atoms.

The alkynyl group is a linear, branched, or cyclic alkynyl group and is preferably a linear alkynyl group.

In the alkynyl group, the number of carbon atoms is preferably 2 to 10, preferably 2 to 6.

$R^{iii1}$ in which, in the alkyl group, one —$CH_2$— is substituted with —O— and one or two or more —$CH_2$—$CH_2$— are substituted with —CH═CH— can represent an alkenyloxy group having 1 to 19 carbon atoms.

The alkenyloxy group is a linear, branched, or cyclic alkenyloxy group and is preferably a linear alkenyloxy group.

In the alkenyloxy group, the number of carbon atoms is preferably 2 to 10, preferably 2 to 6.

$R^{iii1}$ in which, in the alkyl group, one or two or more hydrogen atoms are substituted with halogen atoms can represent a halogenated alkyl group having 1 to 20 carbon atoms.

The halogenated alkyl group is a linear, branched, or cyclic halogenated alkyl group and is preferably a linear halogenated alkyl group.

In the halogenated alkyl group, the number of carbon atoms is preferably 2 to 10, preferably 2 to 6.

In $R^{iii1}$, specific examples of the alkyl group having 1 to 20 carbon atoms (including substituted groups) include groups represented by formulas ($R^{iii1}$-1) to ($R^{iii1}$-31)

[Chem. 18]

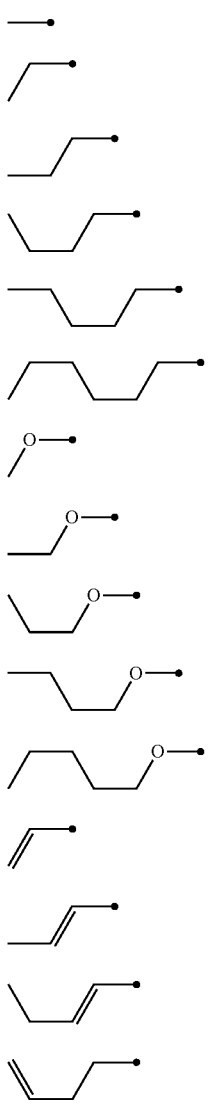
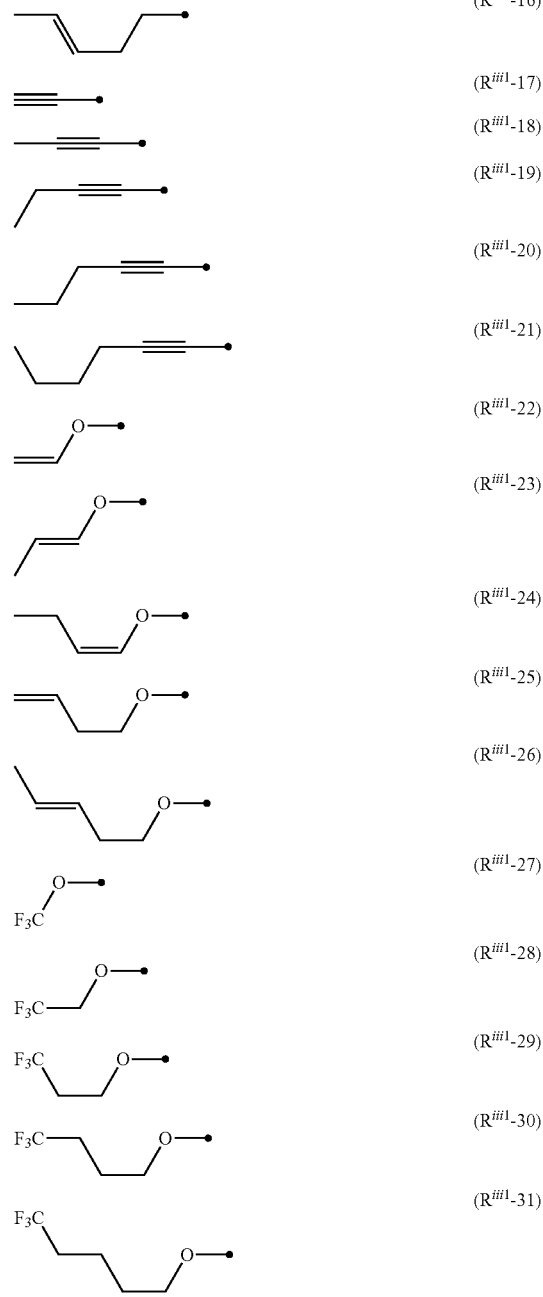

In the formulas ($R^{iii1}$-1) to ($R^{iii1}$-31), the black dots represent points of attachment to the cyclic structure.

Note that $R^{iii1}$ is, from the viewpoint of providing high solubility and decreasing the viscosity of the dye compound-containing liquid crystal composition, preferably a linear alkyl group having 1 to 6 carbon atoms.

In the general formula (iii), $A^{iii1}$ and $A^{iii2}$ each independently represent a group selected from the group consisting of the following group (a) and group (b):
(a) a 1,4-cyclohexylene group (in this group, one —CH$_2$— or non-adjacent two or more —CH$_2$— may be replaced by —O— and/or —S—), and
(b) a 1,4-phenylene group (in this group, one —CH═ or non-adjacent two or more —CH═ may be replaced by —N═).

In $A^{iii1}$ and $A^{iii2}$, one or two or more hydrogen atoms may each independently be substituted with a halogen atom.

Examples of the halogen atom include a fluorine atom, a chlorine atom, a bromine atom, and an iodine atom.

In $A^{iii1}$ and $A^{iii2}$, the substitution positions of the halogen atom are preferably the positions in the following formula ($A^{iii1/2}$-SP-1).

[Chem. 19]

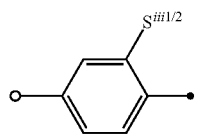

($A^{iii1/2}$-SP-1)

In the formula ($A^{iii1/2}$-SP-1), $S^{iii1/2}$'s each independently represent a halogen atom, the white dot represents the point of attachment to $R^{iii1}$ or $A^{iii1}$, and the black dot represents the point of attachment to $A^{iii2}$ or the (3F,5F)-1,4-phenylene group.

Examples of the halogen atom include a fluorine atom, a chlorine atom, a bromine atom, and an iodine atom.

More specifically, $A^{iii1}$ and $A^{iii2}$ preferably represent any one of the following formulas ($A^{iii1/2}$-1) to ($A^{iii1/2}$-3).

[Chem. 20]

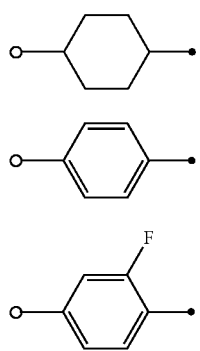

($A^{iii1/2}$-1)

($A^{iii1/2}$-2)

($A^{iii1/2}$-3)

In the formulas ($A^{iii1/2}$-1) to ($A^{iii1/2}$-3), the white dots represent points of attachment to $R^{iii1}$ or $A^{iii1}$ and the black dots represent points of attachment to $A^{iii2}$ or the (3F,5F)-1,4-phenylene group.

The compound represented by the general formula (iii) is preferably compounds represented by the following general formulas (iii-1) to (iii-5).

[Chem. 21]

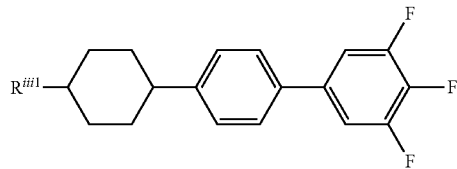

(iii-1)

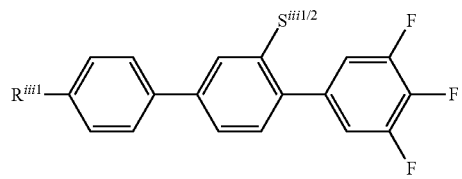

(iii-2)

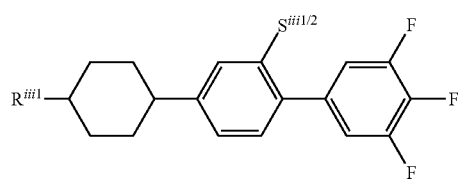

(iii-3)

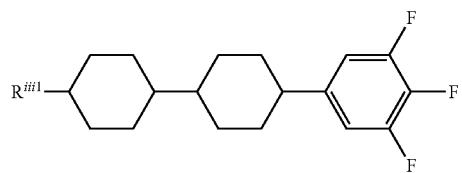

(iii-4)

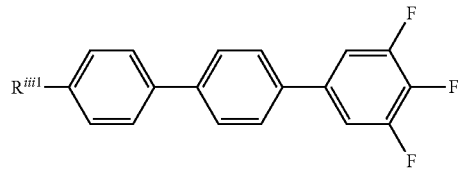

(iii-5)

In the general formulas (iii-1) to (iii-5), $R^{iii1}$'s each have the same meaning and preferred groups as $R^{iii1}$ in the above-described general formula (iii).

In the general formulas (iii-1) to (iii-5), $S^{iii1/2}$'s each independently represent a halogen atom.

Examples of the halogen atom include a fluorine atom, a chlorine atom, a bromine atom, and an iodine atom.

The compound represented by the general formula (iii-1) is preferably a compound represented by the following structural formula (iii-1.1).

[Chem. 22]

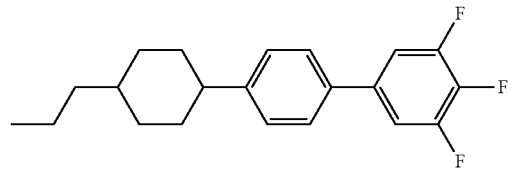

(iii-1.1)

The compound represented by the general formula (iii-2) is preferably a compound represented by the following structural formula (iii-2.1).

[Chem. 23]

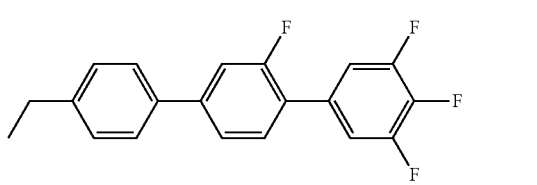

(iii-2.1)

The compound represented by the general formula (iii-3) is preferably a compound represented by the following structural formula (iii-3.1).

[Chem. 24]

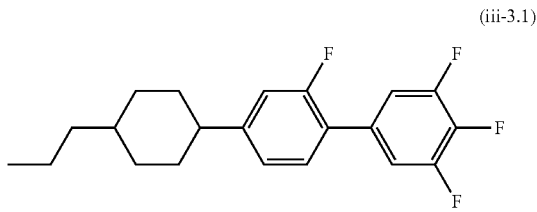

(iii-3.1)

The compound represented by the general formula (iii-4) is preferably a compound represented by the following structural formula (iii-4.1).

[Chem. 25]

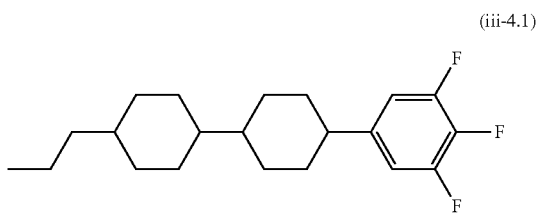

(iii-4.1)

The compound represented by the general formula (iii-5) is preferably a compound represented by the following structural formula (iii-5.1).

[Chem. 26]

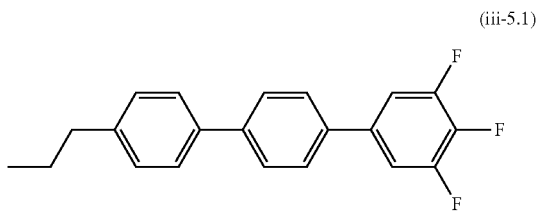

(iii-5.1)

For the compounds represented by the general formula (iii), the general formulas (iii-1) to (iii-5), the structural formula (iii-1.1), the structural formula (iii-2.1), the structural formula (iii-3.1), the structural formula (iii-4.1), and the structural formula (iii-5.1), the number of compounds used in the dye compound-containing liquid crystal composition is 1 or 2 or more, preferably 1 to 5, preferably 1 to 4, preferably 1 to 3, preferably 1 to 2.

The lower limit value of the total content of the compounds represented by the general formula (iii), the general formulas (iii-1) to (iii-5), the structural formula (iii-1.1), the structural formula (iii-2.1), the structural formula (iii-3.1), the structural formula (iii-4.1), and the structural formula (iii-5.1) relative to 100 mass % of the dye compound-containing liquid crystal composition is preferably 1 mass % or more, preferably 5 mass % or more, preferably 10 mass % or more.

The upper limit value of the total content of the compounds represented by the general formula (iii), the general formulas (iii-1) to (iii-5), the structural formula (iii-1.1), the structural formula (iii-2.1), the structural formula (iii-3.1), the structural formula (iii-4.1), and the structural formula (iii-5.1) relative to 100 mass % of the dye compound-containing liquid crystal composition is preferably 35 mass % or less, preferably 30 mass % or less, preferably 25 mass % or less.

The total content of the compounds represented by the general formula (iii), the general formulas (iii-1) to (iii-5), the structural formula (iii-1.1), the structural formula (iii-2.1), the structural formula (iii-3.1), the structural formula (iii-4.1), and the structural formula (iii-5.1) relative to 100 mass % of the dye compound-containing liquid crystal composition is preferably 1 to 35 mass %, preferably 5 to 30 mass %, preferably 10 to 25 mass %.

The compounds represented by the general formula (iii), the general formulas (iii-1) to (iii-5), the structural formula (iii-1.1), the structural formula (iii-2.1), the structural formula (iii-3.1), the structural formula (iii-4.1), and the structural formula (iii-5.1) can be synthesized by publicly known synthesis methods.

(Compound Represented by General Formula (iv))

A dye compound-containing liquid crystal composition according to the present invention, from the viewpoint of decreasing the viscosity of the dye compound-containing liquid crystal composition, may further include one or two or more compounds including a cyclohexane ring and a benzene ring and represented by the following general formula (iv).

[Chem. 27]

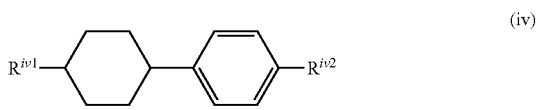

(iv)

In the general formula (iv), $R^{iv1}$ and $R^{iv2}$ each independently represent an alkyl group having 1 to 20 carbon atoms.

The alkyl group having 1 to 20 carbon atoms is a linear, branched, or cyclic alkyl group and is preferably a linear alkyl group.

In the alkyl group having 1 to 20 carbon atoms, the number of carbon atoms is preferably 2 to 10, preferably 2 to 6.

In the alkyl group, one or two or more —$CH_2$— may each independently be substituted with —O— and/or —CO—.

In the alkyl group, one or two or more —$CH_2$—$CH_2$— may each independently be substituted with —CH=CH— and/or —C≡C—.

In the alkyl group, one or two or more hydrogen atoms may each independently be substituted with a halogen atom.

Examples of the halogen atom include a fluorine atom, a chlorine atom, and a bromine atom.

Note that, when the alkyl group is substituted with a predetermined group, no direct bond between an oxygen atom and an oxygen atom is formed.

For example, $R^{iv1}$ and $R^{iv2}$ in which, in such an alkyl group, one —$CH_2$— is substituted with —O— can represent an alkoxy group having 1 to 19 carbon atoms.

The alkoxy group is a linear, branched, or cyclic alkoxy group and is preferably a linear alkoxy group.

In the alkoxy group, the number of carbon atoms is preferably 2 to 10, preferably 2 to 6.

$R^{iv1}$ and $R^{iv2}$ in which, in such an alkyl group, one or two or more —$CH_2$—$CH_2$— are substituted with —CH=CH— can represent an alkenyl group having 1 to 20 carbon atoms.

The alkenyl group is a linear, branched, or cyclic alkenyl group and is preferably a linear alkenyl group.

In the alkenyl group, the number of carbon atoms is preferably 2 to 10, preferably 2 to 6.

$R^{iv1}$ and $R^{iv2}$ in which, in such an alkyl group, one or two or more —$CH_2$—$CH_2$— are substituted with —C≡C— can represent an alkynyl group having 1 to 20 carbon atoms.

The alkynyl group is a linear, branched, or cyclic alkynyl group and is preferably a linear alkynyl group.

In the alkynyl group, the number of carbon atoms is preferably 2 to 10, preferably 2 to 6.

$R^{iv1}$ and $R^{iv2}$ in which, in such an alkyl group, one —$CH_2$— is substituted with —O— and one or two or more —$CH_2$—$CH_2$— are substituted with —CH=CH— can represent an alkenyloxy group having 1 to 19 carbon atoms.

The alkenyloxy group is a linear, branched, or cyclic alkenyloxy group and is preferably a linear alkenyloxy group.

In the alkenyloxy group, the number of carbon atoms is preferably 2 to 10, preferably 2 to 6.

$R^{iv1}$ and $R^{iv2}$ in which, in such an alkyl group, one or two or more hydrogen atoms are substituted with halogen atoms can represent a halogenated alkyl group having 1 to 20 carbon atoms.

The halogenated alkyl group is a linear, branched, or cyclic halogenated alkyl group and is preferably a linear halogenated alkyl group.

In the halogenated alkyl group, the number of carbon atoms is preferably 2 to 10, preferably 2 to 6.

In $R^{iv1}$ and $R^{iv2}$, specific examples of the alkyl group having 1 to 20 carbon atoms (including substituted groups) include groups represented by formulas ($R^{iv1/2}$-1) to ($R^{iv1/2}$-31).

[Chem. 28]

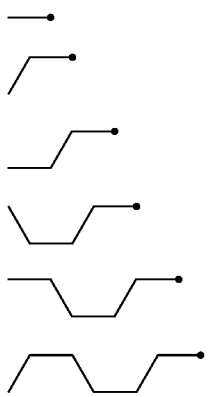
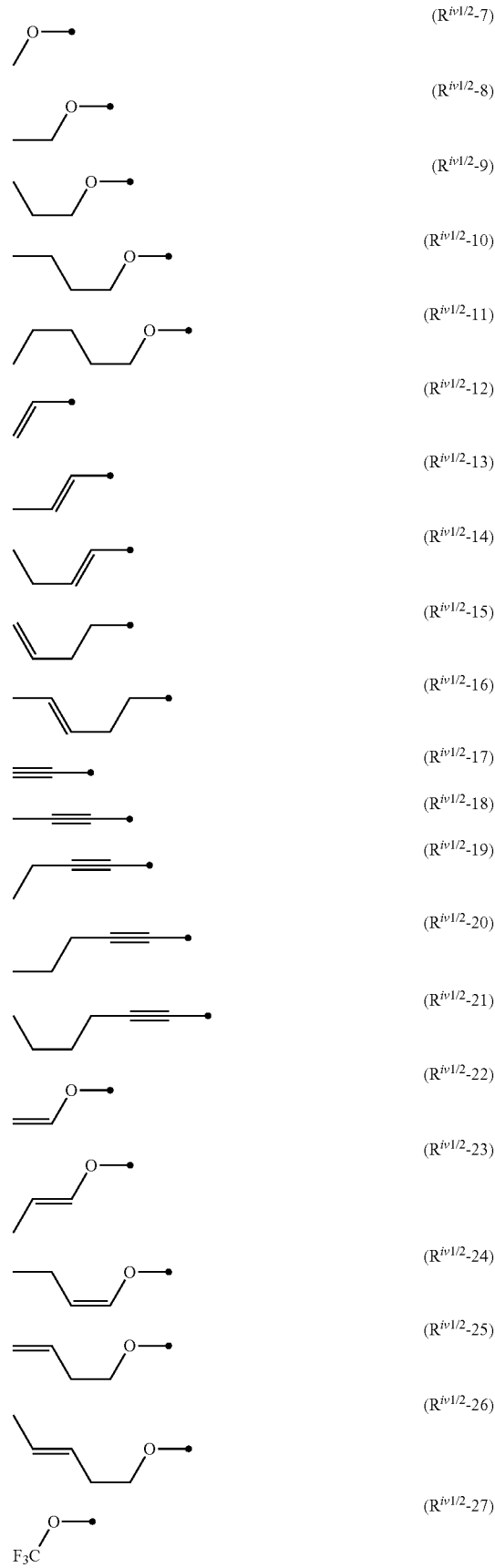

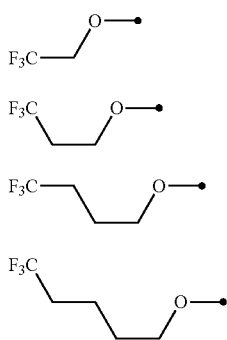

In the formulas ($R^{iv1/2}$-1) to ($R^{iv1/2}$-31), the black dots represent points of attachment to the cyclic structures.

Note that $R^{iv1}$ is, from the viewpoint of decreasing the viscosity of the dye compound-containing liquid crystal composition, preferably a linear alkyl group having 1 to 6 carbon atoms or a linear alkoxy group having 1 to 6 carbon atoms.

$R^{iv2}$ is, from the viewpoint of increasing the refractive index anisotropy of the dye compound-containing liquid crystal composition, preferably a linear alkoxy group having 1 to 6 carbon atoms.

The compound represented by the general formula (iv) is preferably compounds represented by the following structural formulas (iv-1.1) to (iv-1.5).

[Chem. 29]

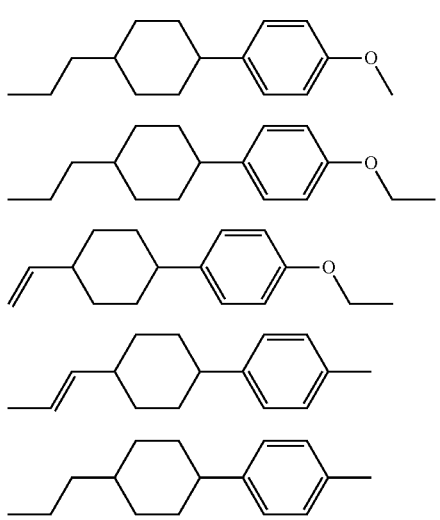

For the compounds represented by the general formula (iv) and the structural formulas (iv-1.1) to (iv-1.5), the number of compounds used in the dye compound-containing liquid crystal composition is 1 or 2 or more, preferably 1 to 5, preferably 1 to 4, preferably 1 to 3, preferably 1 to 2.

The lower limit value of the total content of the compounds represented by the general formula (iv) and the structural formulas (iv-1.1) to (iv-1.5) relative to 100 mass % of the dye compound-containing liquid crystal composition is preferably 1 mass % or more, preferably 3 mass % or more, preferably 5 mass % or more.

The upper limit value of the total content of the compounds represented by the general formula (iv) and the structural formulas (iv-1.1) to (iv-1.5) relative to 100 mass % of the dye compound-containing liquid crystal composition is preferably 45 mass % or less, preferably 40 mass % or less, preferably 35 mass % or less.

The total content of the compounds represented by the general formula (iv) and the structural formulas (iv-1.1) to (iv-1.5) relative to 100 mass % of the dye compound-containing liquid crystal composition is preferably 1 to 45 mass %, preferably 3 to 40 mass %, preferably 5 to 35 mass %.

The compounds represented by the general formula (iv) and the structural formulas (iv-1.1) to (iv-1.5) can be synthesized by publicly known synthesis methods.

(Compound Represented by General Formula (v))

A dye compound-containing liquid crystal composition according to the present invention, from the viewpoint of performing liquid crystal driving at an appropriate voltage, may include one or two or more liquid crystal compounds having a dielectric anisotropy at 25° C. that is positive (2≤Δε), what are called, P-type compounds represented by the following general formula (v).

Note that the dielectric anisotropy (Δε) of a liquid crystal compound is a value determined by extrapolation of the measured value of the dielectric anisotropy of a composition prepared by adding the liquid crystal compound to a composition that is dielectrically substantially neutral at 25° C.

[Chem. 30]

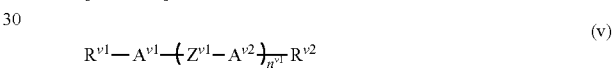

In the general formula (v), $R^{v1}$ each independently represents an alkyl group having 1 to 20 carbon atoms.

The alkyl group having 1 to 20 carbon atoms is a linear, branched, or cyclic alkyl group and is preferably a linear alkyl group.

In the alkyl group having 1 to 20 carbon atoms, the number of carbon atoms is preferably 2 to 10, preferably 2 to 6.

In the alkyl group, one or two or more —$CH_2$— may each independently be substituted with —O— and/or —CO—.

In the alkyl group, one or two or more —$CH_2$—$CH_2$— may each independently be substituted with —CH=CH— and/or —C≡C—.

In the alkyl group, one or two or more hydrogen atoms may each independently be substituted with a halogen atom.

Examples of the halogen atom include a fluorine atom, a chlorine atom, and a bromine atom.

Note that, when the alkyl group is substituted with a predetermined group, no direct bond between an oxygen atom and an oxygen atom is formed.

For example, $R^{v1}$ in which, in the alkyl group, one —$CH_2$— is substituted with —O— can represent an alkoxy group having 1 to 19 carbon atoms.

The alkoxy group is a linear, branched, or cyclic alkoxy group and is preferably a linear alkoxy group.

In the alkoxy group, the number of carbon atoms is preferably 2 to 10, preferably 2 to 6.

$R^{v1}$ in which, in the alkyl group, one or two or more —$CH_2$—$CH_2$— are substituted with —CH=CH— can represent an alkenyl group having 1 to 20 carbon atoms.

The alkenyl group is a linear, branched, or cyclic alkenyl group and is preferably a linear alkenyl group.

In the alkenyl group, the number of carbon atoms is preferably 2 to 10, preferably 2 to 6.

$R^{v1}$ in which, in the alkyl group, one or two or more —CH$_2$—CH$_2$— is substituted with —C≡C— can represent an alkynyl group having 1 to 20 carbon atoms.

The alkynyl group is a linear, branched, or cyclic alkynyl group and is preferably a linear alkynyl group.

In the alkynyl group, the number of carbon atoms is preferably 2 to 10, preferably 2 to 6.

$R^{v1}$ in which, in the alkyl group, one —CH$_2$— is substituted with —O— and one or two or more —CH$_2$—CH$_2$— are substituted with —CH=CH— can represent an alkenyloxy group having 1 to 19 carbon atoms.

The alkenyloxy group is a linear, branched, or cyclic alkenyloxy group and is preferably a linear alkenyloxy group.

In the alkenyloxy group, the number of carbon atoms is preferably 2 to 10, preferably 2 to 6.

$R^{v1}$ in which, in the alkyl group, one or two or more hydrogen atoms are substituted with halogen atoms can represent a halogenated alkyl group having 1 to 20 carbon atoms.

The halogenated alkyl group is a linear, branched, or cyclic halogenated alkyl group and is preferably a linear halogenated alkyl group.

In the halogenated alkyl group, the number of carbon atoms is preferably 2 to 10, preferably 2 to 6.

In $R^{v1}$, specific examples of the alkyl group having 1 to 20 carbon atoms (including substituted groups) include groups represented by formulas ($R^{v1}$-1) to ($R^{v1}$-31).

[Chem. 31]

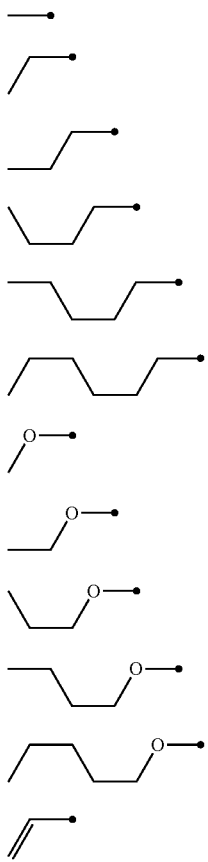

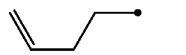
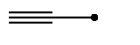
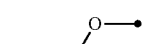
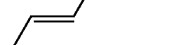
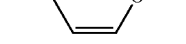
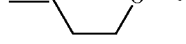
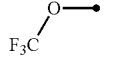
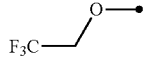
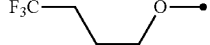

In the formulas ($R^{v1}$-1) to ($R^{v1}$-31), the black dots represent points of attachment to the cyclic structure.

Note that $R^{v1}$ is, from the viewpoint of decreasing the viscosity of the dye compound-containing liquid crystal composition, preferably a linear alkyl group having 1 to 6 carbon atoms.

In the general formula (v), $R^{v2}$ preferably represents any one of a halogen atom, —CN, —OCN, and —C≡CCN.

Examples of the halogen atom include a fluorine atom, a chlorine atom, a bromine atom, and an iodine atom. Note that $R^{v2}$ is, from the viewpoint of providing a dye compound-containing liquid crystal composition having high light resistance or high solubility, preferably a fluorine atom or —CN.

In the general formula (v), $A^{v1}$ and $A^{v2}$ each independently represent a group selected from the group consisting of the following group (a), group (b), and group (c):
  (a) a 1,4-cyclohexylene group (in this group, one —CH$_2$— or non-adjacent two or more —CH$_2$— may be replaced by —O— and/or —S—),
  (b) a 1,4-phenylene group (in this group, one —CH= or non-adjacent two or more —CH= may be replaced by —N=), and
  (c) a naphthalene-2,6-diyl group or decahydronaphthalene-2,6-diyl group (in the naphthalene-2,6-diyl group, one —CH= or non-adjacent two or more —CH= may be substituted with —N=).

In $A^{v1}$ and $A^{v2}$, one or two or more hydrogen atoms may each independently be substituted with a halogen atom.

Examples of the halogen atom include a fluorine atom, a chlorine atom, a bromine atom, and an iodine atom.

In $A^{v1}$ and $A^{v2}$, the substitution position of the halogen atom is preferably any one of the positions in the following formulas ($A^{v1/2}$-SP-1) to ($A^{v1/2}$-SP-2).

[Chem. 32]

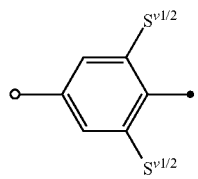
($A^{v1/2}$-SP-1)

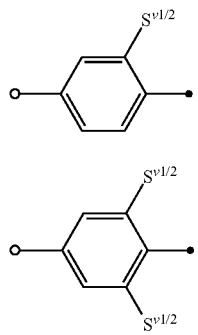
($A^{v1/2}$-SP-2)

In the formulas ($A^{v1/2}$-SP-1) to ($A^{v1/2}$-SP-2), $S^{v1/2}$ is each independently represent a halogen atom, the white dots represent points of attachment to $R^{v1}$ or $Z^{v1}$, and the black dots represent points of attachment to $Z^{v1}$ or $R^{v2}$, Examples of the halogen atom include a fluorine atom, a chlorine atom, a bromine atom, and an iodine atom.

More specifically, $A^{v1}$ and $A^{v2}$ preferably represent any one of the following formulas ($A^{v1/2}$-1) to ($A^{v1/2}$-5)

[Chem. 33]

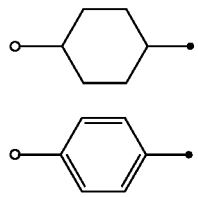
($A^{v1/2}$-1)

($A^{v1/2}$-2)

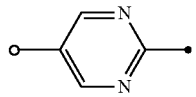
($A^{v1/2}$-3)

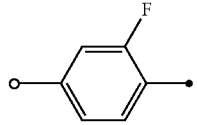
($A^{v1/2}$-4)

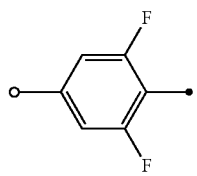
($A^{v1/2}$-5)

In the formulas ($A^{v1/2}$-1) to ($A^{v1/2}$-5), the white dots represent points of attachment to $R^{v1}$ or $Z^{v1}$ and the black dots represent points of attachment to $Z^{v1}$ or $R^{v2}$, In the general formula (v), $Z^{v1}$ represents a single bond or an alkylene group having 1 to 20 carbon atoms.

The alkylene group is a linear, branched, or cyclic alkylene group and is preferably a linear alkylene group.

In the alkylene group, the number of carbon atoms is preferably 2 to 10, preferably 2 to 6.

In the alkylene group, one or two or more —CH$_2$— may each independently be substituted with —O—, —CH(CH$_3$)—, —CO—, and/or —CF$_2$—.

In the alkylene group, one or two or more —CH$_2$—CH$_2$— may each independently be substituted with —CH=CH—, —CF=CH—, —CH=CF—, —CF=CF—, —CH=C(CH$_3$)—, —C(CH$_3$)=CH—, —CH=N—, —N=CH—, —N=N—, and/or —C≡C—.

Note that, when the alkylene group is substituted with a predetermined group, no direct bond between an oxygen atom and an oxygen atom is formed.

Specific examples of the alkylene group having 1 to 20 carbon atoms (including substituted groups) include groups represented by formulas ($Z^{v1}$-1) to ($Z^{v1}$-24).

[Chem. 34]

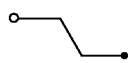
($Z^{v1}$-1)

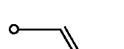
($Z^{v1}$-2)

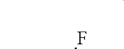
($Z^{v1}$-3)

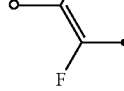
($Z^{v1}$-4)

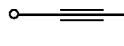
($Z^{v1}$-5)

(Z$^{v1}$-6) 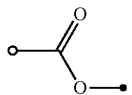
(Z$^{v1}$-7) 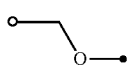
(Z$^{v1}$-8) 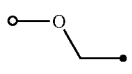
(Z$^{v1}$-9) 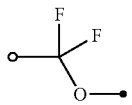
(Z$^{v1}$-10) 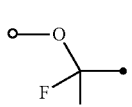
(Z$^{v1}$-11) 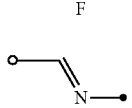
(Z$^{v1}$-12) 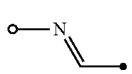
(Z$^{v1}$-13) 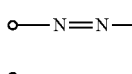
(Z$^{v1}$-14) 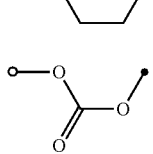
(Z$^{v1}$-15) 
(Z$^{v1}$-16) 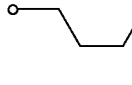
(Z$^{v1}$-17) 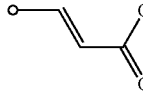
(Z$^{v1}$-18) 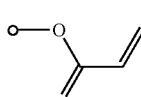
(Z$^{v1}$-19) 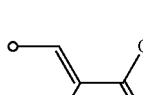
(Z$^{v1}$-20) 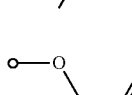
(Z$^{v1}$-21) 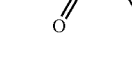

(Z$^{v1}$-22) 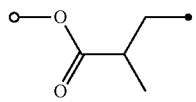
(Z$^{v1}$-23) 
(Z$^{v1}$-24) 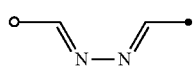

In the formulas (Z$^{v1}$-1) to (Z$^{v1}$-24), the white dots represent points of attachment to A$^{v1}$ or A$^{v2}$ and the black dots represent points of attachment to A$^{v2}$, Note that Z$^{vi1}$ is, from the viewpoint of providing a dye compound-containing liquid crystal composition having high light resistance, preferably a single bond, —CO—O—, —O—CO—, or a linear alkylene group having 1 to 6 carbon atoms.

n$^{v1}$ represents an integer of 1 to 3.

When a plurality of A$^{v2}$ and Z$^{v1}$ are present, they may be the same or different.

Note that, in the compound represented by the general formula (v), the compounds represented by the general formulas (ii) and (iii) (including more specific concepts) are excluded.

The compound represented by the general formula (v) is preferably compounds represented by the following general formulas (v-1) to (v-3).

[Chem. 35]

$$R^{v1}-A^{v1}-Z^{v1}-A^{v2}-R^{v2} \tag{v-1}$$

$$R^{v1}-A^{v1}-Z^{v1}-A^{v2}-Z^{v1-2}-A^{v2-2}-R^{v2} \tag{v-2}$$

$$R^{v1}-A^{v1}-Z^{v1}-A^{v2}-Z^{v1-2}-A^{v2-2}-Z^{v1-3}-A^{v2-3}-R^{v2} \tag{v-3}$$

In the general formulas (v-1) to (v-3), R$^{v1}$, R$^{v2}$, Z$^{v1}$, A$^{v1}$, and A$^{v2}$ respectively have the same meanings and preferred groups as R$^{v1}$, R$^{v2}$, Z$^{v1}$, A$^{v1}$, and A$^{v2}$ in the above-described general formula (v).

In the general formulas (v-1) to (v-3), Z$^{v1-2}$ and Z$^{v1-3}$ each independently have the same meaning and preferred groups as Z$^{v1}$ in the above-described general formula (v).

In the general formulas (v-1) to (v-3), A$^{v2-2}$ and A$^{v2-3}$ each independently have the same meaning and preferred groups as A$^{v1}$ in the above-described general formula (v).

The compound represented by the general formula (v-1) is preferably compounds represented by the following general formulas (v-1-1) to (v-1-10).

[Chem. 36]

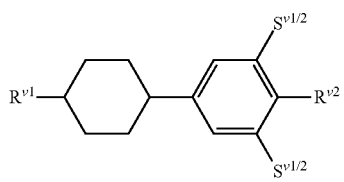

(v-1-1)

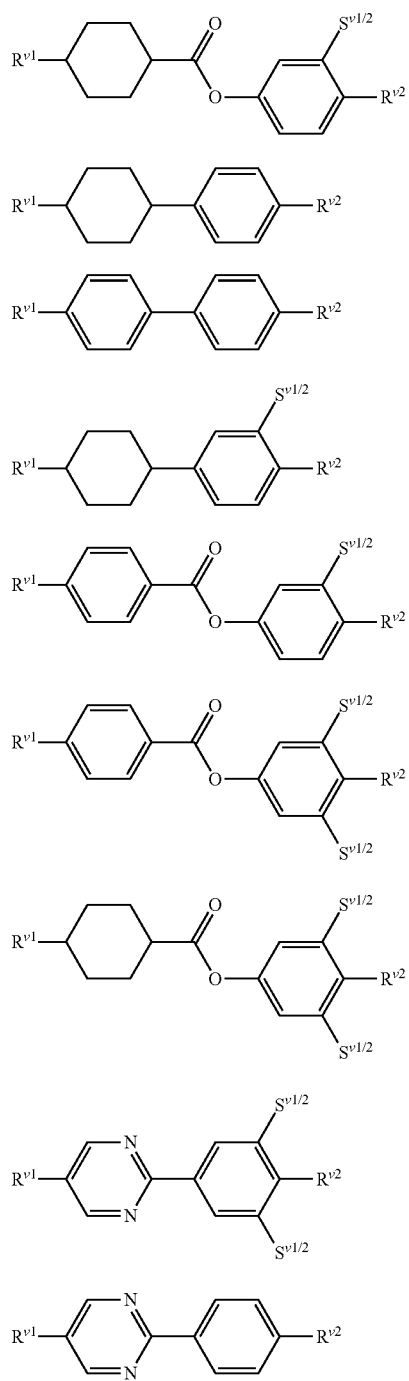

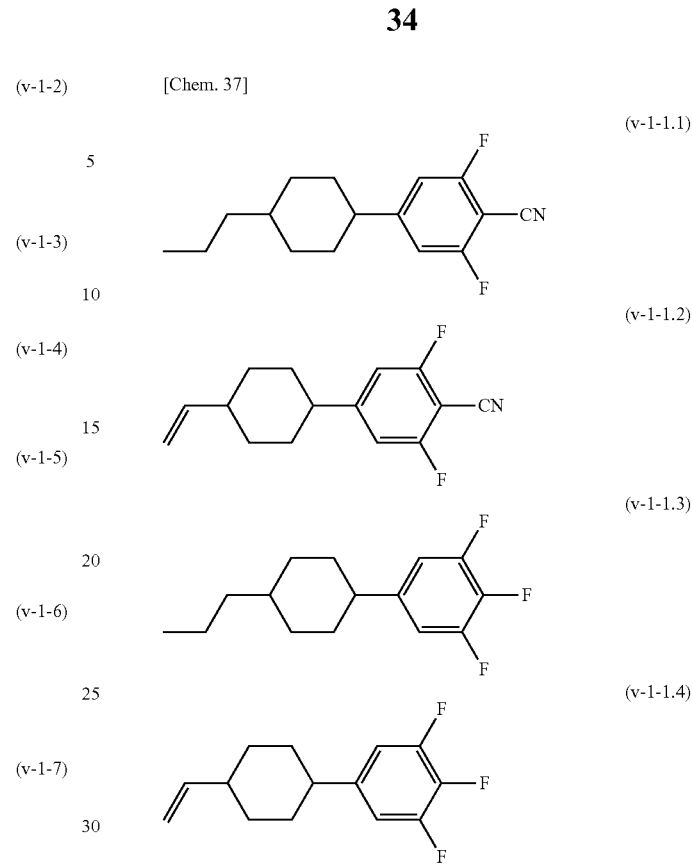

In the general formulas (v-1-1) to (v-1-10), $R^{v1}$ and $R^{v2}$ respectively have the same meanings and preferred groups as $R^{v1}$ and $R^{v2}$ in the above-described general formula (v).

In the general formulas (v-1-1) to (v-1-10), $S^{v1/2}$'s each independently represent a halogen atom.

Examples of the halogen atom include a fluorine atom, a chlorine atom, a bromine atom, and an iodine atom.

The compound represented by the general formula (v-1-1) is preferably compounds represented by the following structural formulas (v-1-1.1) to (v-1-1.4).

The compound represented by the general formula (v-1-2) is preferably a compound represented by the following structural formula (v-1-2.1).

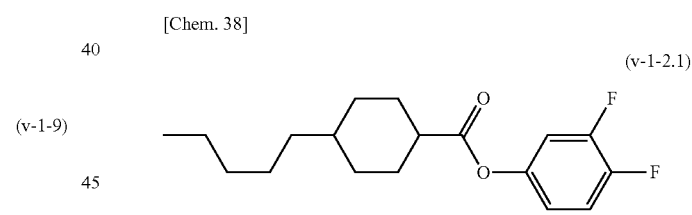

The compound represented by the general formula (v-1-3) is preferably compounds represented by the following structural formulas (v-1-3.1) to (v-1-3.4).

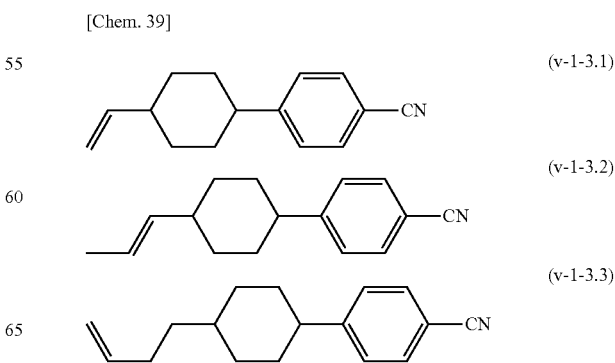

-continued (v-1-3.4)

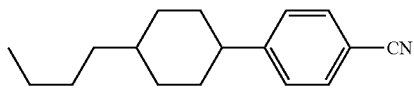

The compound represented by the general formula (v-1-4) is preferably compounds represented by the following structural formulas (v-1-4.1) to (v-1-4.2).

[Chem. 40]

(v-1-4.1)

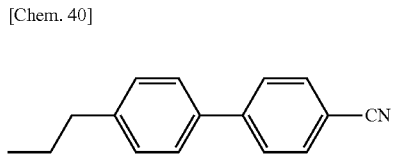

(v-1-4.2)

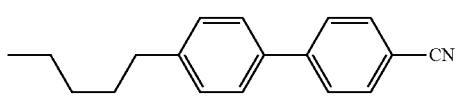

The compound represented by the general formula (v-1-5) is preferably a compound represented by the following structural formula (v-1-5.1).

[Chem. 41]

(v-1-5.1)

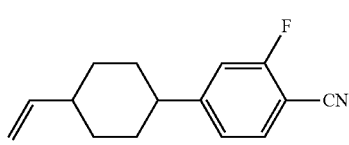

The compound represented by the general formula (v-1-6) is preferably compounds represented by the following structural formula (v-1-6.1) to structural formula (v-1-6.2).

[Chem. 42]

(v-1-6.1)

(v-1-6.2)

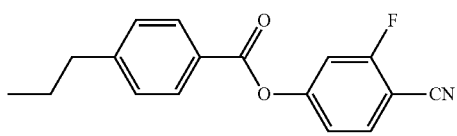

The compound represented by the general formula (v-1-7) is preferably a compound represented by the following structural formula (v-1-7.1).

[Chem. 43]

(v-1-7.1)

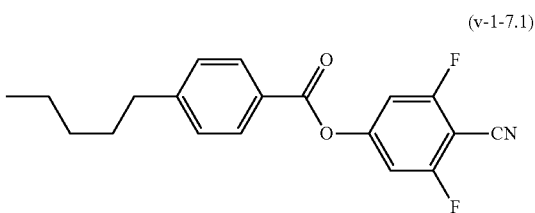

The compound represented by the general formula (v-1-8) is preferably a compound represented by the following structural formula (v-1-8.1).

[Chem. 44]

(v-1-8.1)

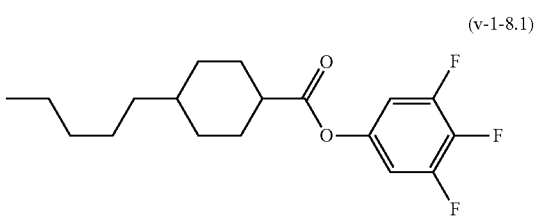

The compound represented by the general formula (v-1-9) is preferably a compound represented by the following structural formula (v-1-9.1).

[Chem. 45]

(v-1-9.1)

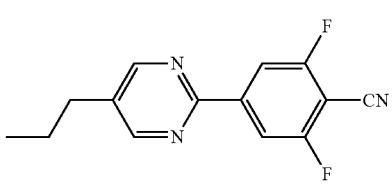

The compound represented by the general formula (v-1-10) is preferably a compound represented by the following structural formula (v-1-10.1).

[Chem. 46]

(v-1-10.1)

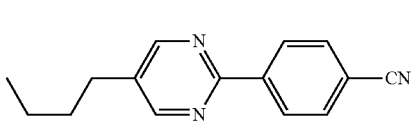

The compound represented by the general formula (v-2) is preferably compounds represented by the following general formulas (v-2-1) to (v-2-5).

[Chem. 47]

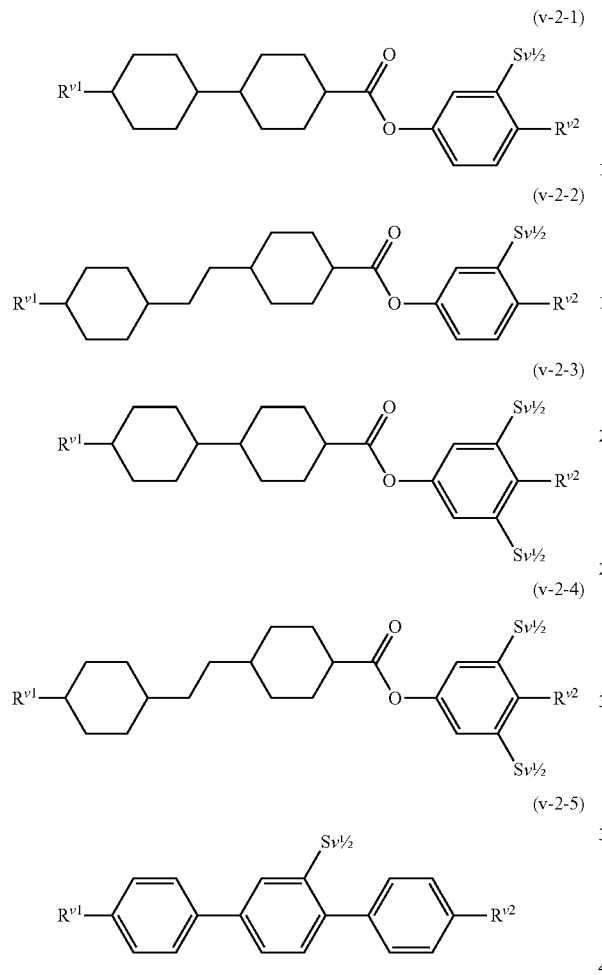

(v-2-1)
(v-2-2)
(v-2-3)
(v-2-4)
(v-2-5)

In the general formulas (v-2-1) to (v-2-5), $R^{v1}$ and $R^{v2}$ respectively have the same meanings and preferred groups as $R^{v1}$ and $R^{v2}$ in the above-described general formula (v).

In the general formulas (v-2-1) to (v-2-5), $S^{v1/2}$'s each independently represent a halogen atom.

Examples of the halogen atom include a fluorine atom, a chlorine atom, a bromine atom, and an iodine atom.

The compound represented by the general formula (v-2-1) is preferably a compound represented by the following structural formula (v-2-1.1).

[Chem. 48]

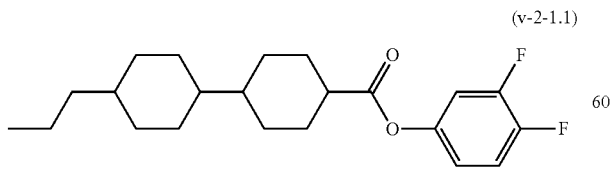

(v-2-1.1)

The compound represented by the general formula (v-2-2) is preferably compounds represented by the following structural formulas (v-2-2.1) to (v-2-2.2).

[Chem. 49]

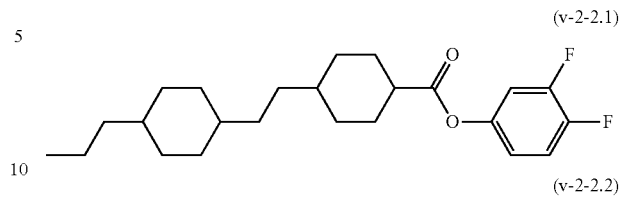

(v-2-2.1)
(v-2-2.2)

The compound represented by the general formula (v-2-3) is preferably a compound represented by the following structural formula (v-2-3.1).

[Chem. 50]

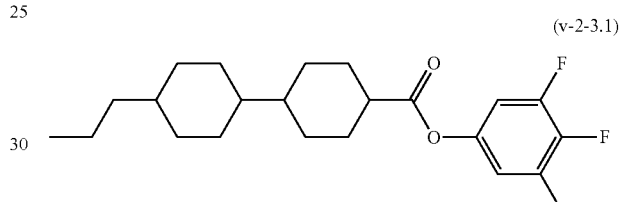

(v-2-3.1)

The compound represented by the general formula (v-2-4) is preferably compounds represented by the following structural formulas (v-2-4.1) to (v-2-4.2).

[Chem. 51]

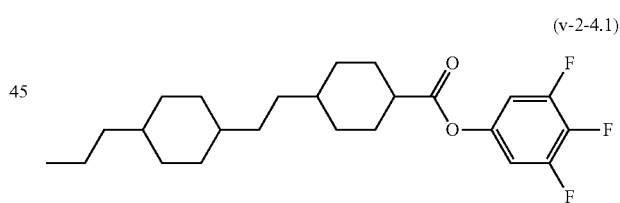

(v-2-4.1)
(v-2-4.2)

The compound represented by the general formula (v-2-5) is preferably a compound represented by the following structural formula (v-2-5.1).

[Chem. 52]

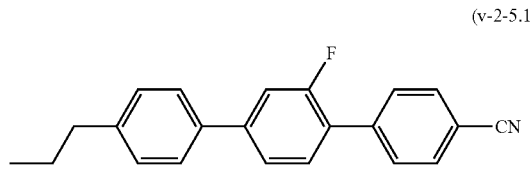

(v-2-5.1)

The compound represented by the general formula (v-3) is preferably compounds represented by the following general formulas (v-3-1) to (v-3-2).

[Chem. 53]

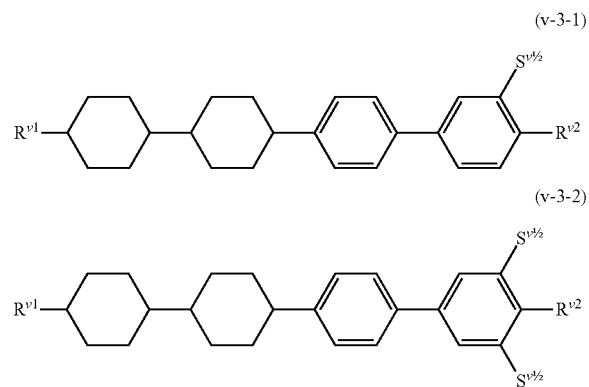

(v-3-1)

(v-3-2)

In the general formulas (v-3-1) to (v-3-2), $R^{v1}$ and $R^{v2}$ respectively have the same meanings and preferred groups as $R^{v1}$ and $R^{v2}$ in the above-described general formula (v).

In the general formulas (v-3-1) to (v-3-2), $S^{v1/2}$'s each independently represent a halogen atom.

Examples of the halogen atom include a fluorine atom, a chlorine atom, a bromine atom, and an iodine atom.

The compound represented by the general formula (v-3-1) is preferably compounds represented by the following structural formulas (v-3-1.1) to (v-3-1.2).

[Chem. 54]

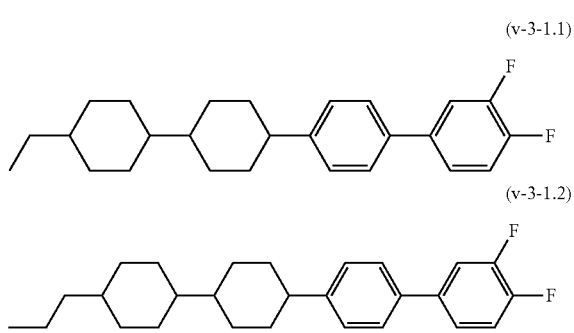

(v-3-1.1)

(v-3-1.2)

The compound represented by the general formula (v-3-1) is preferably compounds represented by the following structural formulas (v-3-2.1) to (v-3-2.2).

[Chem. 55]

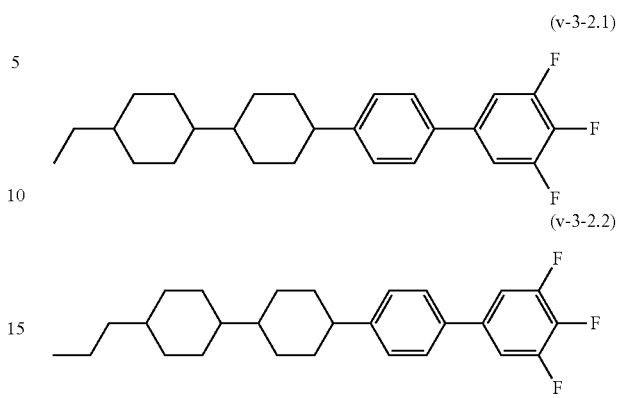

(v-3-2.1)

(v-3-2.2)

For the compounds represented by the general formula (v), the general formulas (v-1) to (v-3), the general formulas (v-1-1) to (v-1-10), the general formulas (v-2-1) to (v-2-5), the general formulas (v-3-1) to (v-3-2), the structural formulas (v-1-1.1) to (v-1-1.4), the structural formula (v-1-2.1), the structural formulas (v-1-3.1) to (v-1-3.4), the structural formulas (v-1-4.1) to (v-1-4.2), the structural formula (v-1-5.1), the structural formula (v-1-6.1) to the structural formula (v-1-6.2), the structural formula (v-1-7.1), the structural formula (v-1-8.1), the structural formula (v-1-9.1), the structural formula (v-1-10.1), the structural formula (v-2-1.1), the structural formulas (v-2-2.1) to (v-2-2.2), the structural formula (v-2-3.1), the structural formulas (v-2-4.1) to (v-2-4.2), the structural formula (v-2-5.1), the structural formulas (v-3-1.1) to (v-3-1.2), and the structural formulas (v-3-2.1) to (v-3-2.2), the number of compounds used in the dye compound-containing liquid crystal composition is 1 or 2 or more, preferably 1 to 6, preferably 1 to 5, preferably 1 to 4, preferably 1 to 3.

The lower limit value of the total content of the compounds represented by the general formula (v), the general formulas (v-1) to (v-3), the general formulas (v-1-1) to (v-1-10), the general formulas (v-2-1) to (v-2-5), the general formulas (v-3-1) to (v-3-2), the structural formulas (v-1-1.1) to (v-1-1.4), the structural formula (v-1-2.1), the structural formulas (v-1-3.1) to (v-1-3.4), the structural formulas (v-1-4.1) to (v-1-4.2), the structural formula (v-1-5.1), the structural formula (v-1-6.1) to the structural formula (v-1-6.2), the structural formula (v-1-7.1), the structural formula (v-1-8.1), the structural formula (v-1-9.1), the structural formula (v-1-10.1), the structural formula (v-2-1.1), the structural formulas (v-2-2.1) to (v-2-2.2), the structural formula (v-2-3.1), the structural formulas (v-2-4.1) to (v-2-4.2), the structural formula (v-2-5.1), the structural formulas (v-3-1.1) to (v-3-1.2), and the structural formulas (v-3-2.1) to (v-3-2.2) relative to 100 mass % of the dye compound-containing liquid crystal composition is preferably 1 mass % or more, preferably 3 mass % or more, preferably 5 mass % or more.

The upper limit value of the total content of the compounds represented by the general formula (v), the general formulas (v-1) to (v-3), the general formulas (v-1-1) to (v-1-10), the general formulas (v-2-1) to (v-2-5), the general formulas (v-3-1) to (v-3-2), the structural formulas (v-1-1.1) to (v-1-1.4), the structural formula (v-1-2.1), the structural formulas (v-1-3.1) to (v-1-3.4), the structural formulas (v-1-4.1) to (v-1-4.2), the structural formula (v-1-5.1), the structural formula (v-1-6.1) to the structural formula (v-1-6.2), the structural formula (v-1-7.1), the structural formula (v-1-

8.1), the structural formula (v-1-9.1), the structural formula (v-1-10.1), the structural formula (v-2-1.1), the structural formulas (v-2-2.1) to (v-2-2.2), the structural formula (v-2-3.1), the structural formulas (v-2-4.1) to (v-2-4.2), the structural formula (v-2-5.1), the structural formulas (v-3-1.1) to (v-3-1.2), and the structural formulas (v-3-2.1) to (v-3-2.2) relative to 100 mass % of the dye compound-containing liquid crystal composition is preferably 50 mass % or less, preferably 45 mass % or less, preferably 40 mass % or less.

The total content of the compounds represented by the general formula (v), the general formulas (v-1) to (v-3), the general formulas (v-1-1) to (v-1-10), the general formulas (v-2-1) to (v-2-5), the general formulas (v-3-1) to (v-3-2), the structural formulas (v-1-1.1) to (v-1-1.4), the structural formula (v-1-2.1), the structural formulas (v-1-3.1) to (v-1-3.4), the structural formulas (v-1-4.1) to (v-1-4.2), the structural formula (v-1-5.1), the structural formula (v-1-6.1) to the structural formula (v-1-6.2), the structural formula (v-1-7.1), the structural formula (v-1-8.1), the structural formula (v-1-9.1), the structural formula (v-1-10.1), the structural formula (v-2-1.1), the structural formulas (v-2-2.1) to (v-2-2.2), the structural formula (v-2-3.1), the structural formulas (v-2-4.1) to (v-4-4.2), the structural formula (v-2-5.1), the structural formulas (v-3-1.1) to (v-3-1.2), and the structural formulas (v-3-2.1) to (v-3-2.2) relative to 100 mass % of the dye compound-containing liquid crystal composition is preferably 1 to 50 mass %, preferably 3 to 45 mass %, preferably 5 to 40 mass %.

The compounds represented by the general formula (v), the general formulas (v-1) to (v-3), the general formulas (v-1-1) to (v-1-10), the general formulas (v-2-1) to (v-2-4), the general formulas (v-3-1) to (v-3-2), the structural formulas (v-1-1.1) to (v-1-1.4), the structural formula (v-1-2.1), the structural formulas (v-1-3.1) to (v-1-3.4), the structural formulas (v-1-4.1) to (v-1-4.2), the structural formula (v-1-5.1), the structural formula (v-1-6.1) to the structural formula (v-1-6.2), the structural formula (v-1-7.1), the structural formula (v-1-8.1), the structural formula (v-1-9.1), the structural formula (v-1-10.1), the structural formula (v-2-1.1), the structural formulas (v-2-2.1) to (v-2-2.2), the structural formula (v-2-3.1), the structural formulas (v-2-4.1) to (v-2-4.2), the structural formulas (v-3-1.1) to (v-3-1.2), and the structural formulas (v-3-2.1) to (v-3-2.2) can be synthesized by publicly known synthesis methods.

(Compound Represented by General Formula (vi))

A liquid crystal composition according to the present invention, from the viewpoint of improving the solubility and improving the light resistance of the dye compound-containing liquid crystal composition, may include one or two or more liquid crystal compounds having a dielectric anisotropy at 25° C. that is neutral (−2<Δε<2), what are called, np-type compounds represented by the following general formula (vi).

Note that the dielectric anisotropy (As) of a liquid crystal compound is a value determined by extrapolation of the measured value of the dielectric anisotropy of a composition prepared by adding the liquid crystal compound to a composition that is dielectrically substantially neutral at 25° C.

[Chem. 56]

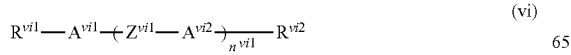

(vi)

In the general formula (vi), $R^{vi1}$ and $R^{vi2}$ each independently represent an alkyl group having 1 to 20 carbon atoms.

The alkyl group having 1 to 20 carbon atoms is a linear, branched, or cyclic alkyl group and is preferably a linear alkyl group.

In the alkyl group having 1 to 20 carbon atoms, the number of carbon atoms is preferably 2 to 10, preferably 2 to 6.

In the alkyl group, one or two or more —$CH_2$— may each independently be substituted with —O— and/or —CO—.

In the alkyl group, one or two or more —$CH_2$—$CH_2$— may each independently be substituted with —CH=CH— and/or —C≡C—.

Note that, when the alkyl group is substituted with a predetermined group, no direct bond between an oxygen atom and an oxygen atom is formed.

For example, $R^{vi1}$ and $R^{vi2}$ in which, in such an alkyl group, one —$CH_2$— is substituted with —O— can represent an alkoxy group having 1 to 19 carbon atoms.

The alkoxy group is a linear, branched, or cyclic alkoxy group and is preferably a linear alkoxy group.

In the alkoxy group, the number of carbon atoms is preferably 2 to 10, preferably 2 to 6.

$R^{vi1}$ and $R^{vi2}$ in which, in such an alkyl group, one or two or more —$CH_2$—$CH_2$— are substituted with —CH=CH— can represent an alkenyl group having 1 to 20 carbon atoms.

The alkenyl group is a linear, branched, or cyclic alkenyl group and is preferably a linear alkenyl group.

In the alkenyl group, the number of carbon atoms is preferably 2 to 10, preferably 2 to 6.

$R^{vi1}$ and $R^{vi2}$ in which, in such an alkyl group, one or two or more —$CH_2$—$CH_2$— are substituted with —C≡C— can represent an alkynyl group having 1 to 20 carbon atoms.

The alkynyl group is a linear, branched, or cyclic alkynyl group and is preferably a linear alkynyl group.

In the alkynyl group, the number of carbon atoms is preferably 2 to 10, preferably 2 to 6.

$R^{vi1}$ and $R^{vi2}$ in which, in such an alkyl group, one —$CH_2$— is substituted with —O— and one or two or more —$CH_2$—$CH_2$— are substituted with —CH=CH— can represent an alkenyloxy group having 1 to 19 carbon atoms.

The alkenyloxy group is a linear, branched, or cyclic alkenyloxy group and is preferably a linear alkenyloxy group.

In the alkenyloxy group, the number of carbon atoms is preferably 2 to 10, preferably 2 to 6.

In $R^{vi1}$ and $R^{vi2}$, specific examples of the alkyl group having 1 to 20 carbon atoms (including substituted groups) include groups represented by formulas ($R^{vi1/2}$-1) to ($R^{vi1/2}$-26).

[Chem. 57]

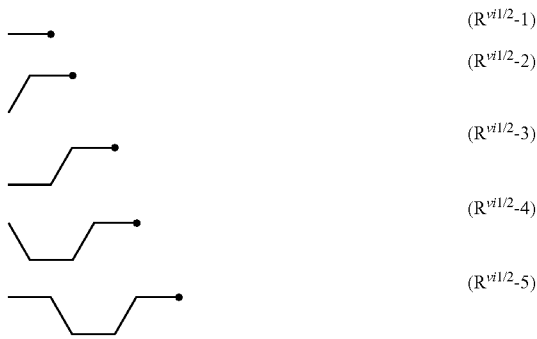

($R^{vi1/2}$-1)

($R^{vi1/2}$-2)

($R^{vi1/2}$-3)

($R^{vi1/2}$-4)

($R^{vi1/2}$-5)

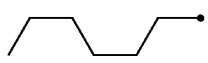 ($R^{vi1/2}$-6)

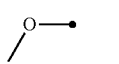 ($R^{vi1/2}$-7)

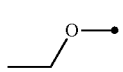 ($R^{vi1/2}$-8)

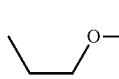 ($R^{vi1/2}$-9)

 ($R^{vi1/2}$-10)

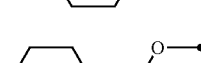 ($R^{vi1/2}$-11)

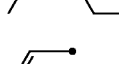 ($R^{vi1/2}$-12)

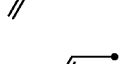 ($R^{vi1/2}$-13)

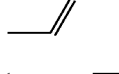 ($R^{vi1/2}$-14)

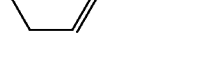 ($R^{vi1/2}$-15)

($R^{vi1/2}$-16)

 ($R^{vi1/2}$-17)

 ($R^{vi1/2}$-18)

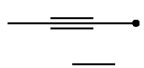 ($R^{vi1/2}$-19)

 ($R^{vi1/2}$-20)

 ($R^{vi1/2}$-21)

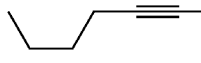 ($R^{vi1/2}$-22)

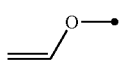 ($R^{vi1/2}$-23)

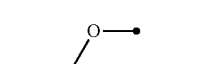 ($R^{vi1/2}$-24)

 ($R^{vi1/2}$-25)

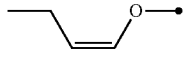 ($R^{vi1/2}$-26)

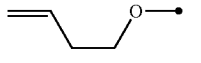

In the formulas ($R^{vi1/2}$-1) to ($R^{vi1/2}$-26), the black dots represent points of attachment to the cyclic structures.

Note that $R^{vi1}$ and $R^{vi2}$ are, from the viewpoint of improving the solubility and improving the light resistance of the dye compound-containing liquid crystal composition, preferably a linear alkyl group having 1 to 6 carbon atoms or a linear alkenyl group having 2 to 6 carbon atoms.

In the general formula (vi), $A^{vi1}$ and $A^{vi2}$ each independently represent a group selected from the group consisting of the following group (a), group (b), and group (c):

(a) a 1,4-cyclohexylene group (in this group, one —CH$_2$— or non-adjacent two or more —CH$_2$— may be replaced by —O— and/or —S—), (b) a 1,4-phenylene group (in this group, one —CH═ or non-adjacent two or more —CH═ may be replaced by —N═), and (c) a naphthalene-2,6-diyl group or decahydronaphthalene-2,6-diyl group (in the naphthalene-2,6-diyl group, one —CH═ or non-adjacent two or more —CH═ may be substituted with —N═).

In $A^{vi1}$ and $A^{vi2}$, one or two or more hydrogen atoms may each independently be substituted with an alkyl group having 1 to 6 carbon atoms.

The alkyl group having 1 to 6 carbon atoms is preferably a methyl group, an ethyl group, or an n-propyl group.

In $A^{vi1}$ and $A^{vi2}$, the substitution position of the alkyl group having 1 to 6 carbon atoms is preferably the position in the following formula ($A^{vi1/2}$-SP-1)

[Chem. 58]

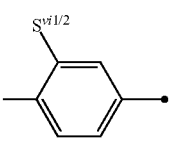 ($A^{vi1/2}$-SP-1)

In the formula ($A^{vi1/2}$-SP-1), $S^{vi1/2}$ represents an alkyl group having 1 to 6 carbon atoms, the white dot represents the point of attachment to $R^{vi1}$ or $Z^{vi1}$, and the black dot represents the point of attachment to $Z^{vi1}$ or $R^{vi2}$.

The alkyl group having 1 to 6 carbon atoms is preferably a methyl group, an ethyl group, or an n-propyl group.

More specifically, $A^{vi1}$ and $A^{vi2}$ preferably represent any one of the following formulas ($A^{vi1/2}$-1) to ($A^{vi1/2}$-3).

[Chem. 59]

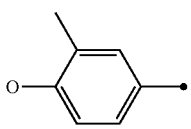

($A^{vi1/2}$-1)

($A^{vi1/2}$-2)

($A^{vi1/2}$-3)

In the formulas ($A^{vi1/2}$-1) to ($A^{vi1/2}$-3), the white dots represent points of attachment to $R^{vi1}$ or $Z^{vi1}$, and the black dots represent points of attachment to $Z^{vi1}$ or $R^{vi2}$.

In the general formula (vi), $Z^{vi1}$ represents a single bond or an alkylene group having 1 to 20 carbon atoms.

The alkylene group is a linear, branched, or cyclic alkylene group and is preferably a linear alkylene group.

In the alkylene group, the number of carbon atoms is preferably 2 to 10, preferably 2 to 6.

In the alkylene group, one or two or more —CH$_2$— may each independently be substituted with —O—, —CH(CH$_3$)—, —CO—, and/or —CF$_2$—.

In the alkylene group, one or two or more —CH$_2$—CH$_2$— may each independently be substituted with —CH=CH—, —CF=CH—, —CH=CF—, —CF=CF—, —CH=C(CH$_3$)—, —C(CH$_3$)=CH—, —CH=N—, —N=CH—, —N=N—, and/or —C≡C—.

Note that, when the alkylene group is substituted with a predetermined group, no direct bond between an oxygen atom and an oxygen atom is formed.

Specific examples of the alkylene group having 1 to 20 carbon atoms (including substituted groups) include groups represented by formulas ($Z^{vi1}$-1) to ($Z^{vi1}$-24).

[Chem. 60]

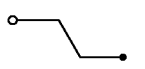
($Z^{i1/2}$-1)

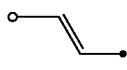
($Z^{i1/2}$-2)

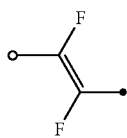
($Z^{i1/2}$-3)

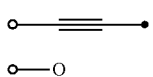
($Z^{i1/2}$-4)

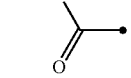
($Z^{i1/2}$-5)

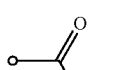
($Z^{i1/2}$-6)

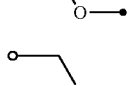
($Z^{i1/2}$-7)

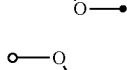
($Z^{i1/2}$-8)

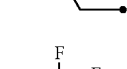
($Z^{i1/2}$-9)

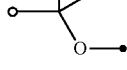
($Z^{i1/2}$-10)

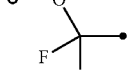
($Z^{i1/2}$-11)

-continued

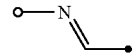
($Z^{i1/2}$-12)

($Z^{i1/2}$-13)

($Z^{i1/2}$-14)

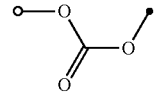
($Z^{i1/2}$-15)

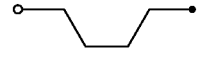
($Z^{i1/2}$-16)

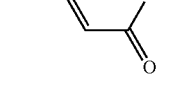
($Z^{i1/2}$-17)

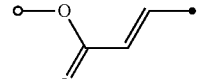
($Z^{i1/2}$-18)

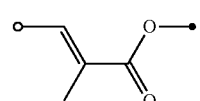
($Z^{i1/2}$-19)

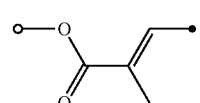
($Z^{i1/2}$-20)

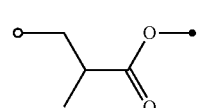
($Z^{i1/2}$-21)

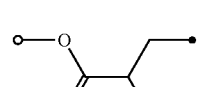
($Z^{i1/2}$-22)

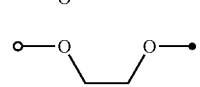
($Z^{i1/2}$-23)

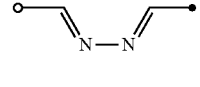
($Z^{i1/2}$-24)

In the formulas ($Z^{vi1}$-1) to ($Z^{vi1}$-24), the white dots represent points of attachment to the $A^{vi1}$ or $A^{vi2}$ and the black dots represent points of attachment to $A^{vi2}$.

Note that $Z^{vi1}$ is, from the viewpoint of improving the solubility and improving the light resistance of the dye compound-containing liquid crystal composition, preferably a single bond, —CO—O—, or —O—CO—.

$n^{vi1}$ represents an integer of 1 to 3.

When a plurality of $A^{vi2}$ and $Z^{vi1}$ are present, they may be the same or different.

Note that, in the compound represented by the general formula (vi), the compounds represented by the general formulas (i) and (iv) (including more specific concepts) are excluded.

The compound represented by the general formula (vi) is preferably compounds represented by the following general formulas (vi-1) to (vi-3).

[Chem. 61]

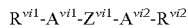  (vi-1)

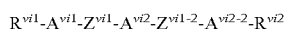  (vi-2)

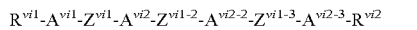  (vi-3)

In the general formulas (vi-1) to (vi-3), $R^{vi1}$, $R^{vi2}$, $Z^{vi1}$, $A^{vi1}$, and $A^{vi2}$ respectively have the same meanings and preferred groups as $R^{vi1}$, $R^{vi2}$, $Z^{vi1}$, $A^{vi1}$, and $A^{vi2}$ in the above-described general formula (vi).

In the general formulas (vi-1) to (vi-3), $Z^{vi1-2}$ and $Z^{vi1-3}$ each independently have the same meaning and preferred groups as $Z^{vi1}$ in the above-described general formula (vi).

In the general formulas (vi-1) to (vi-3), $A^{vi2-2}$ and $A^{vi2-3}$ each independently have the same meaning and preferred groups as $A^{vi1}$ in the above-described general formula (vi).

The compound represented by the general formula (vi-1) is preferably compounds represented by the following general formulas (vi-1-1) to (vi-1-4).

[Chem. 62]

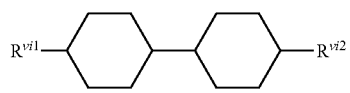  (vi-1-1)

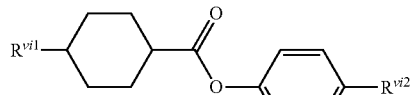  (vi-1-2)

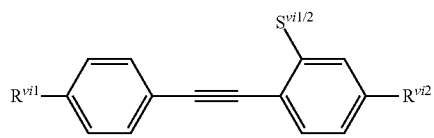  (vi-1-3)

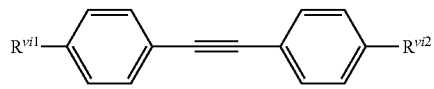  (vi-1-4)

In the general formulas (vi-1-1) to (vi-1-4), $R^{vi1}$ and $R^{vi2}$ respectively have the same meanings and preferred groups as $R^{vi1}$ and $R^{vi2}$ in the above-described general formula (v). In the general formulas (vi-1-1) to (vi-1-4), $S^{vi1/2}$ represents an alkyl group having 1 to 6 carbon atoms.

The alkyl group having 1 to 6 carbon atoms is preferably a methyl group, an ethyl group, or an n-propyl group.

The compound represented by the general formula (vi-1-1) is preferably compounds represented by the following structural formulas (vi-1-1.1) to (vi-1-1.8).

[Chem. 63]

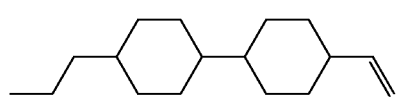  (vi-1-1.1)

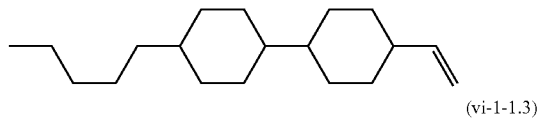  (vi-1-1.2)

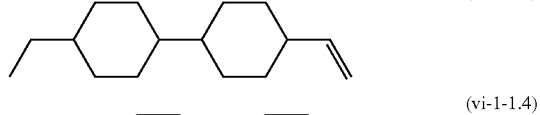  (vi-1-1.3)

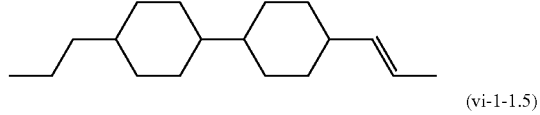  (vi-1-1.4)

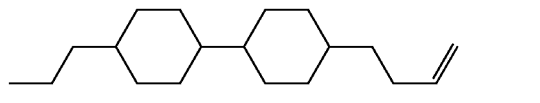  (vi-1-1.5)

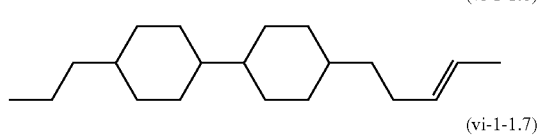  (vi-1-1.6)

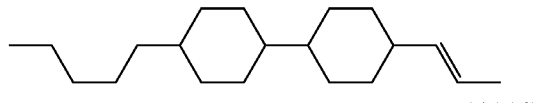  (vi-1-1.7)

(vi-1-1.8)

The compound represented by the general formula (vi-1-2) is preferably compounds represented by the following structural formulas (vi-1-2.1) to (vi-1-2.5).

[Chem. 64]

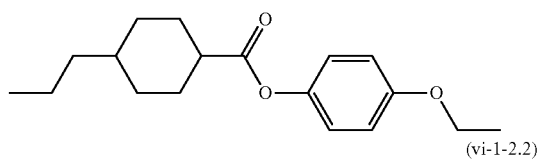  (vi-1-2.1)

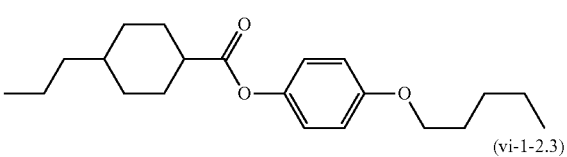  (vi-1-2.2)

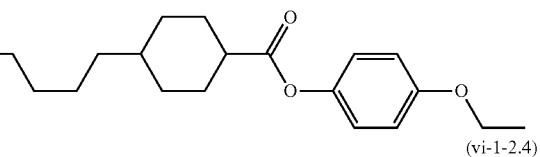  (vi-1-2.3)

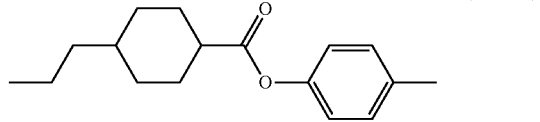  (vi-1-2.4)

(vi-1-2.5)

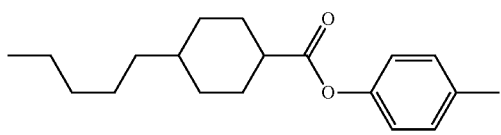

The compound represented by the general formula (vi-1-3) is preferably a compound represented by the following structural formula (vi-1-3.1).

[Chem. 65]

(vi-1-3.1)

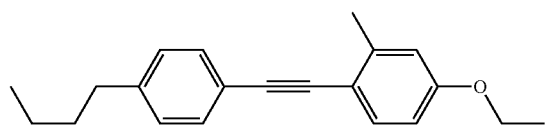

The compound represented by the general formula (vi-1-4) is preferably compounds represented by the following structural formulas (vi-1-4.1) to (vi-1-4.2).

[Chem. 66]

(vi-1-4.1)

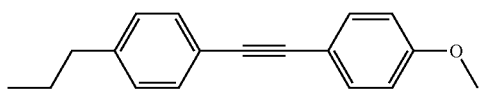

(vi-1-4.2)

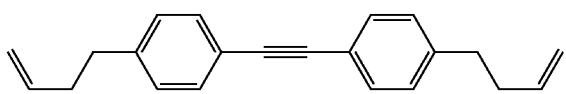

The compound represented by the general formula (vi-2) is preferably compounds represented by the following general formulas (vi-2-1) to (vi-2-8).

[Chem. 67]

(vi-2-1)

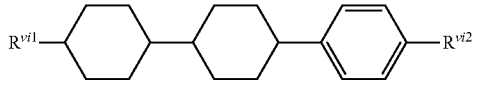

(vi-2-2)

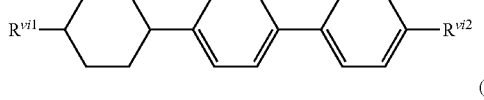

(vi-2-3)

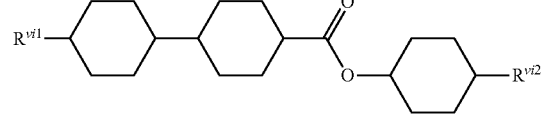

(vi-2-4)

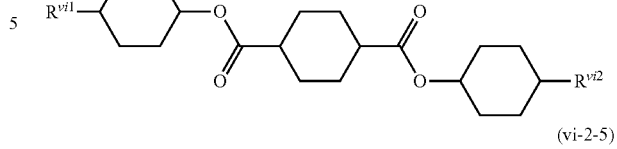

(vi-2-5)

$R^{vi1}$—〇—〇—≡—〇—$R^{vi2}$ (vi-2-6)

$R^{vi1}$—〇—〇—≡—〇($S^{vi1/2}$)—$R^{vi2}$ (vi-2-7)

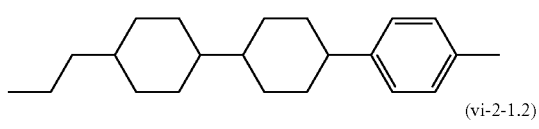

(vi-2-8)

$R^{vi1}$—〇—〇—〇—$R^{vi2}$

In the general formulas (vi-2-1) to (vi-2-8), $R^{vi1}$ and $R^{vi2}$ respectively have the same meanings and preferred groups as $R^{vi1}$ and $R^{vi2}$ in the above-described general formula (vi).

In the general formulas (vi-2-1) to (vi-2-8), $S^{vi1/2}$ represents an alkyl group having 1 to 6 carbon atoms.

The alkyl group having 1 to 6 carbon atoms is preferably a methyl group, an ethyl group, or an n-propyl group.

The compound represented by the general formula (vi-2-1) is preferably compounds represented by the following structural formulas (vi-2-1.1) to (vi-2-1.4).

[Chem. 68]

(vi-2-1.1)

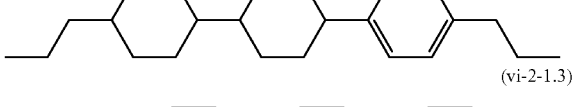

(vi-2-1.2)

(vi-2-1.3)

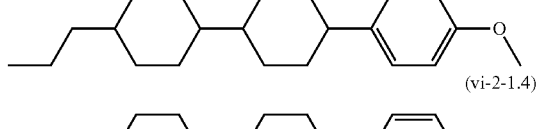

(vi-2-1.4)

The compound represented by the general formula (vi-2-2) is preferably compounds represented by the following structural formulas (vi-2-2.1) to (vi-2-2.5).

[Chem. 69]

(vi-2-2.1)

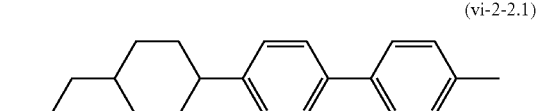

(vi-2-2.2)

(vi-2-2.3)

(vi-2-2.4)

(vi-2-2.5)

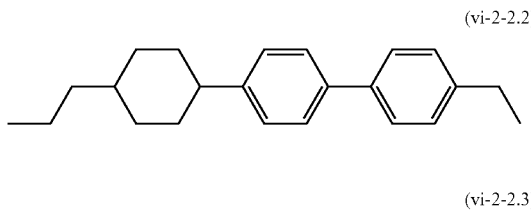

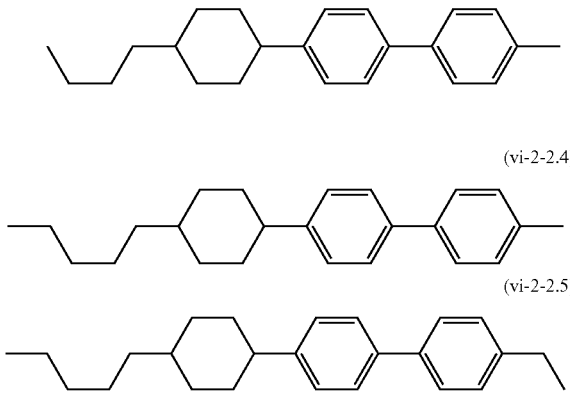

The compound represented by the general formula (vi-2-3) is preferably compounds represented by the following structural formulas (vi-2-3.1) to (vi-2-3.3).

[Chem. 70]

(vi-2-3.1)

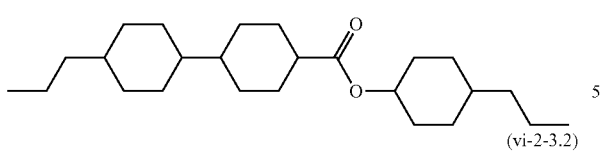

(vi-2-3.2)

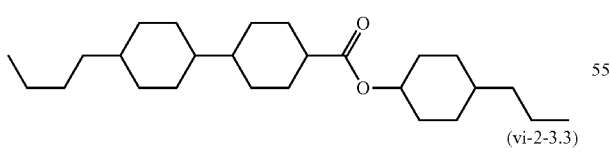

(vi-2-3.3)

The compound represented by the general formula (vi-2-4) is preferably compounds represented by the following structural formulas (vi-2-4.1) to (vi-2-4.2).

[Chem. 71]

(vi-2-2.1)

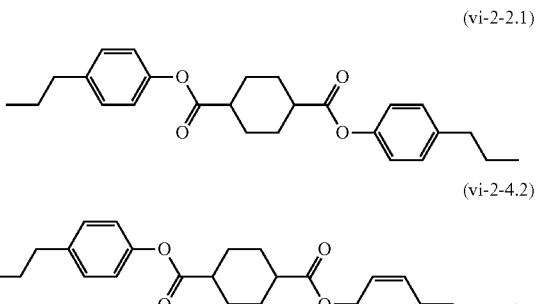

(vi-2-4.2)

The compound represented by the general formula (vi-2-5) is preferably a compound represented by the following structural formula (vi-2-5.1).

[Chem. 72]

(vi-2-5.1)

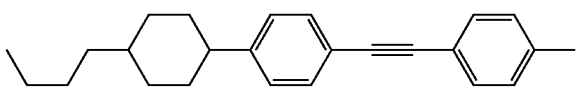

The compound represented by the general formula (vi-2-6) is preferably a compound represented by the following structural formula (vi-2-6.1).

[Chem. 73]

(vi-2-6.1)

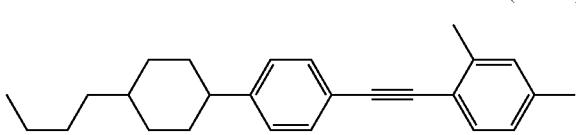

The compound represented by the general formula (vi-2-7) is preferably a compound represented by the following structural formula (vi-2-7.1).

[Chem. 74]

(vi-2-7.1)

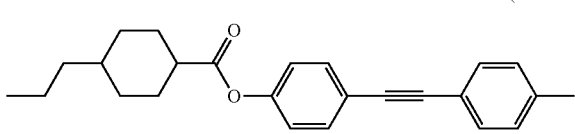

The compound represented by the general formula (vi-2-8) is preferably compounds represented by the following structural formulas (vi-2-8.1) to (vi-2-8.5).

[Chem. 75]

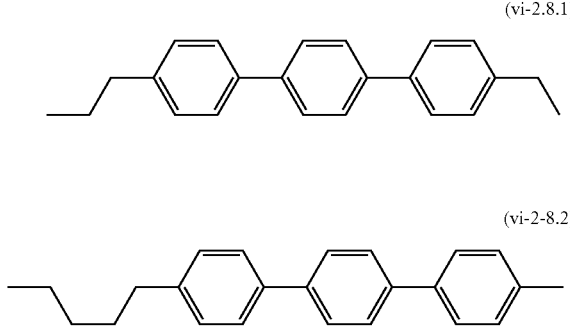

(vi-2.8.1)

(vi-2-8.2)

The compound represented by the general formula (vi-3) is preferably compounds represented by the following general formulas (vi-3-1) to (vi-3-2).

[Chem. 76]

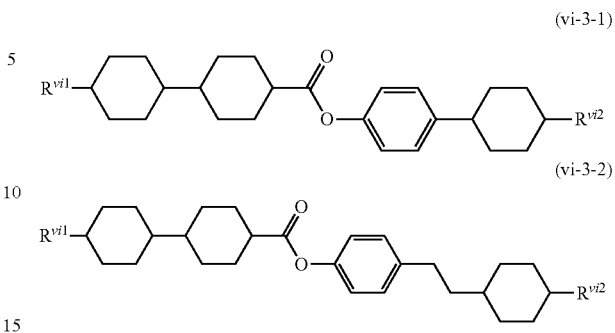

(vi-3-1)

(vi-3-2)

In the general formulas (vi-3-1) to (vi-3-2), $R^{vi1}$ and $R^{vi2}$ respectively have the same meanings and preferred groups as $R^{vi1}$ and $R^{vi2}$ in the above-described general formula (v).

The compound represented by the general formula (vi-3-1) is preferably compounds represented by the following structural formulas (vi-3-1.1) to (vi-3-1.3).

[Chem. 77]

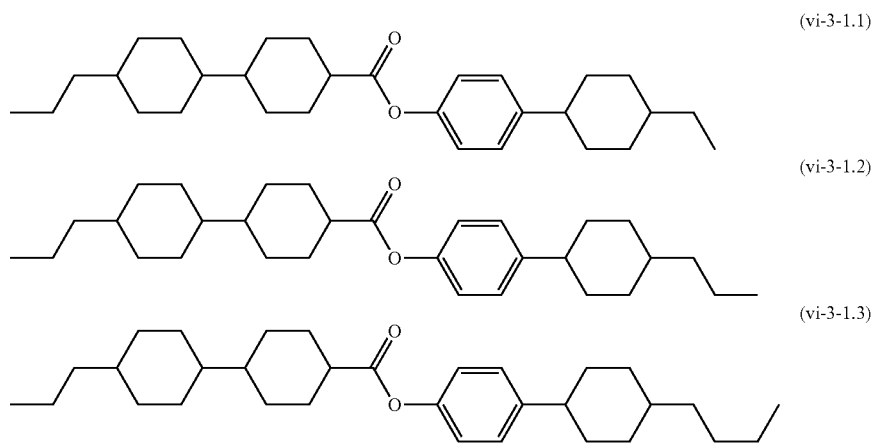

(vi-3-1.1)

(vi-3-1.2)

(vi-3-1.3)

The compound represented by the general formula (vi-3-2) is preferably compounds represented by the following structural formulas (vi-3-2.1) to (vi-3-2.2).

[Chem. 78]

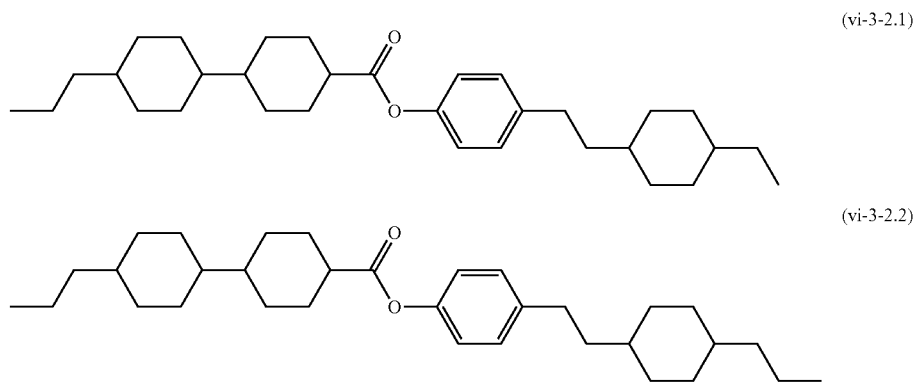

(vi-3-2.1)

(vi-3-2.2)

For the compounds represented by the general formula (vi), the general formulas (vi-1) to (vi-3), the general formulas (vi-1-1) to (vi-1-4), the general formulas (vi-2-1) to (vi-2-8), the general formulas (vi-3-1) to (vi-3-2), the structural formulas (vi-1-1.1) to (vi-1-1.8), the structural formulas (vi-1-2.1) to (vi-1-2.5), the structural formula (vi-1-3.1), the structural formulas (vi-1-4.1) to (vi-1-4.2), the structural formulas (vi-2-1.1) to (vi-2-1.4), the structural formulas (vi-2-2.1) to (vi-2-2.5), the structural formulas (vi-2-3.1) to (vi-2-3.3), the structural formulas (vi-2-4.1) to (vi-2-4.2), the structural formula (vi-2-5.1), the structural formula (vi-2-6.1), the structural formula (vi-2-7.1), the structural formulas (vi-2-8.1) to the structural formula (vi-2-8.2), the structural formulas (vi-3-1.1) to (vi-3-1.3), and the structural formulas (vi-3-2.1) to (vi-3-2.2), the number of compounds used in the liquid crystal composition is 1 or 2 or more, preferably 1 to 5, preferably 1 to 4, preferably 1 to 3, preferably 1 to 2.

The lower limit value of the total content of the compounds represented by the general formula (vi), the general formulas (vi-1) to (vi-3), the general formulas (vi-1-1) to (vi-1-4), the general formulas (vi-2-1) to (vi-2-8), the general formulas (vi-3-1) to (vi-3-2), the structural formulas (vi-1-1.1) to (vi-1-1.8), the structural formulas (vi-1-2.1) to (vi-1-2.5), the structural formula (vi-1-3.1), the structural formulas (vi-1-4.1) to (vi-1-4.2), the structural formulas (vi-2-1.1) to (vi-2-1.4), the structural formulas (vi-2-2.1) to (vi-2-2.5), the structural formulas (vi-2-3.1) to (vi-2-3.3), the structural formulas (vi-2-4.1) to (vi-2-4.2), the structural formula (vi-2-5.1), the structural formula (vi-2-6.1), the structural formula (vi-2-7.1), the structural formulas (vi-2-8.1) to the structural formula (vi-2-8.2), the structural formulas (vi-3-1.1) to (vi-3-1.3), and the structural formulas (vi-3-2.1) to (vi-3-2.2) relative to 100 mass % of the liquid crystal composition is preferably 1 mass % or more, preferably 3 mass % or more, preferably 5 mass % or more.

The upper limit value of the total content of the compounds represented by the general formula (vi), the general formulas (vi-1) to (vi-3), the general formulas (vi-1-1) to (vi-1-4), the general formulas (vi-2-1) to (vi-2-8), the general formulas (vi-3-1) to (vi-3-2), the structural formulas (vi-1-1.1) to (vi-1-1.8), the structural formulas (vi-1-2.1) to (vi-1-2.5), the structural formula (vi-1-3.1), the structural formulas (vi-1-4.1) to (vi-1-4.2), the structural formulas (vi-2-1.1) to (vi-2-1.4), the structural formulas (vi-2-2.1) to (vi-2-2.5), the structural formulas (vi-2-3.1) to (vi-2-3.3), the structural formulas (vi-2-4.1) to (vi-2-4.2), the structural formula (vi-2-5.1), the structural formula (vi-2-6.1), the structural formula (vi-2-7.1), the structural formula (vi-2-8.1) to the structural formula (vi-2-8.2), the structural formulas (vi-3-1.1) to (vi-3-1.3), and the structural formulas (vi-3-2.1) to (vi-3-2.2) relative to 100 mass % of the liquid crystal composition is preferably 50 mass % or less, preferably 45 mass % or less, preferably 40 mass % or less.

The total content of the compounds represented by the general formula (vi), the general formulas (vi-1) to (vi-3), the general formulas (vi-1-1) to (vi-1-4), the general formulas (vi-2-1) to (vi-2-8), the general formulas (vi-3-1) to (vi-3-2), the structural formulas (vi-1-1.1) to (vi-1-1.8), the structural formulas (vi-1-2.1) to (vi-1-2.5), the structural formula (vi-1-3.1), the structural formulas (vi-1-4.1) to (vi-1-4.2), the structural formulas (vi-2-1.1) to (vi-2-1.4), the structural formulas (vi-2-2.1) to (vi-2-2.5), the structural formulas (vi-2-3.1) to (vi-2-3.3), the structural formulas (vi-2-4.1) to (vi-2-4.2), the structural formula (vi-2-5.1), the structural formula (vi-2-6.1), the structural formula (vi-2-7.1), the structural formula (vi-2-8.1) to the structural formula (vi-2-8.2), the structural formulas (vi-3-1.1) to (vi-3-1.3), and the structural formulas (vi-3-2.1) to (vi-3-2.2) relative to 100 mass % of the liquid crystal composition is preferably 1 to 50 mass %, preferably 3 to 45 mass %, preferably 5 to 40 mass %.

The compounds represented by the general formula (vi), the general formulas (vi-1) to (vi-3), the general formulas (vi-1-1) to (vi-1-4), the general formulas (vi-2-1) to (vi-2-8), the general formulas (vi-3-1) to (vi-3-2), the structural formulas (vi-1-1.1) to (vi-1-1.8), the structural formulas (vi-1-2.1) to (vi-1-2.5), the structural formula (vi-1-3.1), the structural formulas (vi-1-4.1) to (vi-1-4.2), the structural formulas (vi-2-1.1) to (vi-2-1.4), the structural formulas (vi-2-2.1) to (vi-2-2.5), the structural formulas (vi-2-3.1) to (vi-2-3.3), the structural formulas (vi-2-4.1) to (vi-2-4.2), the structural formula (vi-2-5.1), the structural formula (vi-2-6.1), the structural formula (vi-2-7.1), the structural formulas (vi-2-8.1) to the structural formula (vi-2-8.2), the structural formulas (vi-3-1.1) to (vi-3-1.3), and the structural formulas (vi-3-2.1) to (vi-3-2.2) can be synthesized by publicly known synthesis methods.

(Dye Compound)

A liquid crystal composition according to the present invention includes one or two or more dye compounds.

Such a dye compound preferably has a maximum absorption in a range of preferably 350 to 700 nm, more preferably 400 to 650 nm.

The maximum absorption wavelength is measured in the following manner.

First, in 100 parts by mass of an appropriate liquid crystal composition in which the dye compound can dissolve, 1.0 part by mass of the dye compound is added and dissolved, to prepare a sample.

Subsequently, two 2 cm×2 cm glass substrates including an ITO electrode and a homogeneous alignment film on the ITO electrode are used such that the ITO electrode layers are disposed inside of the cell to produce the cell adjusted, using plastic particles, so as to have a cell thickness of 10 μm and including an injection port.

Into the cell, the sample is injected and the injection port is sealed using a sealing material, to thereby produce a device.

Subsequently, a spectrometer (manufactured by Otsuka Electronics Co., Ltd., "LCD-5200") is used, under conditions of 25° C. and no voltage application, to measure the produced device in terms of the absorption spectrum in the range of 350 to 750 nm, to thereby determine the maximum absorption wavelength of the dye compound.

In the case of using a plurality of dye compounds, the plurality of dye compounds are preferably different in the absorption wavelengths, which can provide a desired color such as black.

The dye compound is preferably a dichroic dye.

The dye compound is preferably selected from the group consisting of azo-based compounds, anthraquinone-based compounds, methine-based compounds, azomethine-based compounds, merocyanine-based compounds, quinone-based compounds, naphthoquinone-based compounds, tetrazine-based compounds, perylene-based compounds, terrylene-based compounds, quaterrylene-based compounds, higher rylene-based compounds, indigo-based compounds, dioxazine-based compounds, azulene-based compounds, pyrromethene-based compounds, spiropyran-based compounds, and diarylethene-based compounds.

Examples of the azo-based compounds include disazo-based compounds and trisazo-based compounds.

Specific examples of the dye compound include SI-486 (yellow, dichroic dye, azo-based compound), SI-426 (red, dichroic dye, azo-based compound), G-472 (blue, dichroic dye, azo-based compound), M-483 (dichroic dye, blue), and M-412 (dichroic dye, blue).

The number of dye compounds used in the dye compound-containing liquid crystal composition is 1 or 2 or more, preferably 1 to 5, preferably 1 to 4, preferably 1 to 3.

The lower limit value of the total content of the dye compound relative to 100 mass % of the dye compound-containing liquid crystal composition is preferably 0.1 mass % or more, preferably 0.5 mass % or more, preferably 1 mass % or more.

The upper limit value of the total content of the dye compound relative to 100 mass % of the dye compound-containing liquid crystal composition is preferably 20 mass % or less, preferably 15 mass % or less, preferably 10 mass % or less.

The total content of the dye compound relative to 100 mass % of the dye compound-containing liquid crystal composition is preferably 0.1 to 20 mass %, preferably 0.5 to 15 mass %, preferably 1 to 10 mass %.

The lower limit value of the amount of dye compound added relative to 100 parts by mass of the liquid crystal composition not including dye compounds or additives is preferably 0.1 parts by mass or more, preferably 0.5 parts by mass or more, preferably 1 part by mass or more.

The upper limit value of the amount of dye compound added relative to 100 parts by mass of the liquid crystal composition not including dye compounds or additives is preferably 20 parts by mass or less, preferably 15 parts by mass or less, preferably 10 parts by mass or less.

The amount of dye compound added relative to 100 parts by mass of the liquid crystal composition not including dye compounds or additives is preferably 0.1 to 20 parts by mass, preferably 0.5 to 15 parts by mass, preferably 1 to 10 parts by mass.

(Dye Compound-Containing Liquid Crystal Composition)

A dye compound-containing liquid crystal composition according to the present invention can be produced by, for example, mixing together compounds represented by the above-described general formulas (i) to (ii), a dye compound, and, as needed, the above-described other compounds and additives.

More specifically, it can be produced by performing a step of mixing together the compounds represented by the above-described general formulas (i) to (ii) and, as needed, the above-described other compounds to thereby obtain a liquid crystal composition used for a dye compound-containing liquid crystal composition, and a step of mixing the liquid crystal composition used for the dye compound-containing liquid crystal composition, with a dye compound and, as needed, additives to thereby obtain the dye compound-containing liquid crystal composition.

Alternatively, it can be produced by performing a step of mixing, in an appropriate order, a liquid crystal compound constituting a liquid crystal composition used for the dye compound-containing liquid crystal composition, a dye compound, and, as needed, additives to thereby obtain the dye compound-containing liquid crystal composition.

Examples of the additives include stabilizers, chiral dopants, antistatic agents, nematic liquid crystal, smectic liquid crystal, cholesteric liquid crystal, chiral dopants, and polymerizable compounds.

Examples of the stabilizers include antioxidants, ultraviolet (UV) absorbents, light stabilizers, and infrared absorbents.

Examples of the antioxidants include hydroquinone derivatives, nitrosamine-based polymerization inhibitors, and hindered phenol-based antioxidants.

More specifically, examples include tert-butylhydroquinone, methylhydroquinone, products manufactured by Wako Pure Chemical Industries, Ltd. such as "Q-1300" and "Q-1301", and products manufactured by BASF such as "IRGANOX1010", "IRGANOX1035", "IRGANOX1076", "IRGANOX1098", "IRGANOX1135", "IRGANOX1330", "IRGANOX1425", "IRGANOX1520", "IRGANOX1726", "IRGANOX245", "IRGANOX259", "IRGANOX3114", "IRGANOX3790", "IRGANOX5057", and "IRGANOX565".

As the ultraviolet (UV) absorbents, from the viewpoint of having high absorbency for ultraviolet rays at wavelengths of 370 nm or less and providing good liquid crystal displaying, preferred are absorbents having less absorbency for visible light at wavelengths of 400 nm or more.

More specifically, examples include hindered phenol-based compounds, benzotriazole-based compounds, hydroxybenzophenone-based compounds, salicylic ester-based compounds, benzophenone-based compounds, cyanoacrylate-based compounds, nickel complex salt-based compounds, and triazine-based compounds.

Examples of the hindered phenol-based compounds include 2,6-di-tert-butyl-p-cresol, pentaerythrityl-tetrakis[3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, and tris-(3,5-di-tert-butyl-4-hydroxybenzyl)-isocyanurate.

Examples of the benzotriazole-based compounds include 2-(2'-hydroxy-5'-methylphenyl)benzotriazole, 2,2-methylenebis(4-(1,1,3,3-tetramethylbutyl)-6-(2H-benzotriazol-2-yl)phenol), 2,4-bis-(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, and pentaerythrityl-tetrakis[3-(3,5-di-tert-butyl-4-hydroxyphenyl)propionate].

More specifically, examples include products manufactured by BASF Japan Ltd. such as "TINUVIN109", "TINUVIN171", "TINUVIN326", "TINUVIN327", "TINUVIN328", "TINUVIN770", "TINUVIN900", and "TINUVIN928", and products manufactured by Chemipro Kasei Kaisha, Ltd. such as "KEMISORB 71", "KEMISORB 73", and "KEMISORB 74".

The number of stabilizers used in the dye compound-containing liquid crystal composition is 1 or 2 or more, preferably 1 to 5, preferably 1 to 4, preferably 1 to 3, preferably 1 to 2.

In the case of using such a stabilizer, the lower limit value of the total content of the stabilizer relative to 100 mass % of the dye compound-containing liquid crystal composition is preferably 0.01 mass % or more, preferably 0.05 mass % or more, preferably 0.1 mass % or more.

In the case of using the stabilizer, the upper limit value of the total content of the stabilizer relative to 100 mass % of the dye compound-containing liquid crystal composition is preferably 2.0 mass % or less, preferably 1.5 mass % or less, preferably 1.0 mass % or less.

In the case of using the stabilizer, the total content of the stabilizer relative to 100 mass % of the dye compound-containing liquid crystal composition is preferably 0.01 to 2.0 mass %, preferably 0.05 to 1.5 mass %, preferably 0.1 to 1.0 mass %.

In the case of using the stabilizer, the lower limit value of the amount of stabilizer added relative to 100 parts by mass of the liquid crystal composition not including dye compounds or additives is preferably 0.01 parts by mass or more, preferably 0.05 parts by mass or more, preferably 0.1 parts by mass or more.

In the case of using the stabilizer, the upper limit value of the amount of stabilizer added relative to 100 parts by mass of the liquid crystal composition not including dye compounds or additives is preferably 2.0 parts by mass or less, preferably 1.5 parts by mass or less, preferably 1.0 part by mass or less.

In the case of using the stabilizer, the amount of stabilizer added relative to 100 parts by mass of the liquid crystal composition not including dye compounds or additives is preferably 0.01 to 2.0 parts by mass, preferably 0.05 to 1.5 parts by mass, preferably 0.1 to 1.0 part by mass.

When the dye compound-containing liquid crystal composition is produced so as to include a chiral dopant, helical twisting of the liquid crystal can be caused.

The chiral dopant may be right-handed or left-handed and such chiral dopants are appropriately selected in accordance with the configuration of the device.

As such chiral dopants, chiral dopants used for the TN mode or the STN mode may be used.

Examples of the chiral dopant include "Chiral S-811 (compound represented by the following structural formula (CA-1))".

compounds or additives is preferably 0.05 parts by mass or more, preferably 0.1 parts by mass or more, preferably 0.3 parts by mass or more, preferably 0.5 parts by mass or more.

In the case of using the chiral dopant, the upper limit value of the amount of chiral dopant added relative to 100 parts by mass of the liquid crystal composition not including dye compounds or additives is preferably 5 parts by mass or less, preferably 3.0 parts by mass or less, preferably 2.0 parts by mass or less, preferably 1.5 parts by mass or less.

In the case of using the chiral dopant, the amount of chiral dopant added relative to 100 parts by mass of the liquid crystal composition not including dye compounds or additives is preferably 0.05 to 5 parts by mass, preferably 0.1 to 3.0 parts by mass, preferably 0.3 to 2.0 parts by mass, preferably 0.5 to 1.5 parts by mass.

From the viewpoint of providing a dye compound-containing liquid crystal composition that has both of high light resistance and high solubility, the content of the compound represented by the above-described general formula (i) and/or (ii) is preferably 10 mass % or more, preferably 10 to 20 mass %.

Note that this content relation can also be applied to desired more specific concepts of the compound represented by the general formula (i) and/or the compound represented by the general formula (ii), and can also be applied to desired combinations of the compound represented by the general formula (i) and/or the compound represented by the general formula (ii) including more specific concepts.

From the viewpoint of providing a dye compound-containing liquid crystal composition that has both of high light resistance and high solubility, in the case of using the

[Chem. 79]

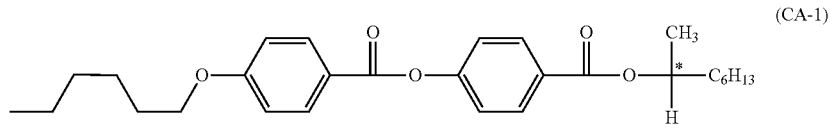

(CA-1)

Note that, in the structural formula (CA-1), "*" represents an asymmetric center.

The number of chiral dopants used in the dye compound-containing liquid crystal composition is 1 or 2 or more, preferably 1 to 5, preferably 1 to 4, preferably 1 to 3, preferably 1 to 2, preferably 1.

In the case of using such a chiral dopant, the lower limit value of the total content of the stabilizer relative to 100 mass % of the dye compound-containing liquid crystal composition is preferably 0.05 mass % or more, preferably 0.1 mass % or more, preferably 0.3 mass % or more, preferably 0.5 mass % or more.

In the case of using the chiral dopant, the upper limit value of the total content of the stabilizer relative to 100 mass % of the dye compound-containing liquid crystal composition is preferably 5 mass % or less, preferably 3.0 mass % or less, preferably 2.0 mass % or less, preferably 1.5 mass % or less.

In the case of using the chiral dopant, the total content of the stabilizer relative to 100 mass % of the dye compound-containing liquid crystal composition is preferably 0.05 to 5 mass %, preferably 0.1 to 3.0 mass %, preferably 0.3 to 2.0 mass %, preferably 0.5 to 1.5 mass %.

In the case of using the chiral dopant, the lower limit value of the amount of chiral dopant added relative to 100 parts by mass of the liquid crystal composition not including dye compound represented by the general formula (iii), the total content of the compound represented by the general formula (i), the compound represented by the general formula (ii), and the compound represented by the general formula (iii) relative to 100 mass % of the dye compound-containing liquid crystal composition is preferably 20 mass % or more, preferably 25 to 65 mass %, preferably 30 to 60 mass %, preferably 35 to 55 mass %.

Note that this content relation can also be applied to desired more specific concepts of the compound represented by the general formula (i), the compound represented by the general formula (ii), and/or the compound represented by the general formula (iii), and can also be applied to desired combinations of the compound represented by the general formula (i), the compound represented by the general formula (ii), and/or the compound represented by the general formula (iii) including more specific concepts.

From the viewpoint of providing a dye compound-containing liquid crystal composition that has both of high light resistance and high solubility, in the case of using the compound represented by the general formula (iv), the total content of the compound represented by the general formula (i), the compound represented by the general formula (ii), and the compound represented by the general formula (iv) relative to 100 mass % of the dye compound-containing liquid crystal composition is preferably 20 mass % or more, preferably 25 to 75 mass %, preferably 30 to 70 mass %, preferably 35 to 65 mass %.

Note that this content relation can also be applied to desired more specific concepts of the compound represented by the general formula (i), the compound represented by the general formula (ii), and/or the compound represented by the general formula (iv), and can also be applied to desired combinations of the compound represented by the general formula (i), the compound represented by the general formula (ii), and/or the compound represented by the general formula (iv) including more specific concepts.

The liquid-crystal-phase upper limit temperature ($T_{NI}$) is a temperature at which the liquid crystal composition undergoes phase transition from the nematic phase to the isotropic phase.

For the liquid-crystal-phase upper limit temperature ($T_{NI}$) of the liquid crystal composition used for a dye compound-containing liquid crystal composition according to the present invention, from the viewpoint that the higher the $T_{NI}$, the higher the temperature at which the nematic phase can be maintained and the wider the driving temperature range, $T_{NI}$ is preferably 95° C. or more, preferably 100 to 150° C., preferably 100 to 130° C.

The liquid-crystal-phase lower limit temperature ($T_{\rightarrow N}$) is a temperature at which the liquid crystal composition undergoes phase transition from another phase (glass, the smectic phase, or the crystal phase) to the nematic phase.

For the liquid-crystal-phase lower limit temperature ($T_{\rightarrow N}$) of the liquid crystal composition used for a dye compound-containing liquid crystal composition according to the present invention, from the viewpoint that the lower the $T_{\rightarrow N}$, the lower the temperature at which the nematic phase can be maintained and hence the wider the driving temperature range, $T_{\rightarrow N}$ is preferably −15° C. or less, preferably −78 to −20° C., preferably −65 to −25° C.

The refractive index anisotropy (Δn) at 25° C. and at 589 nm of the liquid crystal composition used for a dye compound-containing liquid crystal composition according to the present invention is preferably 0.05 or more, preferably 0.06 to 0.20, preferably 0.07 to 0.15, preferably 0.08 to 0.13.

For the liquid crystal composition used for a dye compound-containing liquid crystal composition according to the present invention, the refractive index ($n_e$) in the long axis direction of liquid crystal molecules at 25° C. and at 589 nm is preferably 1.4 or more, preferably 1.45 to 1.65, preferably 1.50 to 1.63.

For the liquid crystal composition used for a dye compound-containing liquid crystal composition according to the present invention, the refractive index (no) in the short axis direction of liquid crystal molecules at 25° C. and at 589 nm is preferably 1.3 or more, preferably 1.35 to 1.55, preferably 1.40 to 1.53.

Note that an Abbe refractometer can be used to measure ne and no of the liquid crystal composition used for the dye compound-containing liquid crystal composition and Δn can be calculated.

For the liquid crystal composition used for a dye compound-containing liquid crystal composition according to the present invention, the dielectric anisotropy (Δε) at 25° C. is preferably positive (2≤Δε).

For the liquid crystal composition used for a dye compound-containing liquid crystal composition according to the present invention, the dielectric anisotropy (Δε) at 25° C. is more specifically preferably 2.0 to 20.0, preferably 2.5 to 15.0, preferably 3.0 to 10.0, preferably 3.5 to 7.0, preferably 4.0 to 6.0.

For the liquid crystal composition used for a dye compound-containing liquid crystal composition according to the present invention, the long-axis-direction dielectric constant ($\varepsilon_{\parallel}$) of liquid crystal molecules at 25° C. is, preferably 5.0 or more, preferably 5.5 to 30.0, preferably 6.0 to 20.0, preferably 6.0 to 15.0, preferably 6.5 to 10.0.

For the liquid crystal composition used for a dye compound-containing liquid crystal composition according to the present invention, the short-axis-direction dielectric constant ($\varepsilon_{\perp}$) of liquid crystal molecules at 25° C. is preferably 1.5 or more, preferably 2.0 to 7.0, preferably 2.5 to 5.0, preferably 2.5 to 4.0.

For the liquid crystal composition used for a dye compound-containing liquid crystal composition according to the present invention, the rotational viscosity ($\gamma_1$) at 25° C. is preferably 100 to 180 mPa·s, preferably 105 to 175 mPa·s, preferably 110 to 170 mPa·s, preferably 115 to 165 mPa·s.

For the liquid crystal composition used for a dye compound-containing liquid crystal composition according to the present invention, the elastic constant $K_{11}$ at 25° C. is preferably 1.0 to 30.0 pN, preferably 5.0 to 25.0 pN, preferably 10.0 to 20.0 pN.

For the liquid crystal composition used for a dye compound-containing liquid crystal composition according to the present invention, the elastic constant $K_{22}$ at 25° C. is preferably 1.0 to 25.0 pN, preferably 3.0 to 20.0 pN, preferably 5.0 to 15.0 pN.

For the liquid crystal composition used for a dye compound-containing liquid crystal composition according to the present invention, the elastic constant $K_{33}$ at 25° C. is preferably 1.0 to 35.0 pN, preferably 5.0 to 30.0 pN, preferably 10.0 to 25.0 pN.

(Device)

Hereinafter, a device including the above-described dye compound-containing liquid crystal composition will be described.

Applications of the device are preferably photochromic devices.

The device preferably has a configuration in which a substrate including a first transparent electrode layer and a substrate including a second transparent electrode layer are disposed such that the substrates face each other and the transparent electrode layers are disposed inside, and the above-described liquid crystal composition is sandwiched between the substrates.

The transparent electrode layers are preferably ITO electrodes.

The substrates including the first and/or second transparent electrode layer may include, on such a transparent electrode layer, an alignment film.

The alignment film is preferably a homogeneous alignment film.

A chiral dopant can be added to the dye compound-containing liquid crystal composition, to thereby provide twisted alignment of the liquid crystal.

In the case of adding a chiral dopant, in the dye compound-containing liquid crystal composition, the twist of the liquid crystal molecules is, from the viewpoint of increasing the absorbance, preferably 180° or more, preferably 180 to 720°, preferably 270 to 540°, preferably 270 to 450°.

The twist of the liquid crystal molecules can also be adjusted by adjusting the angle of the alignment axis using positions of the substrate including the first transparent electrode layer and the substrate including the second transparent electrode layer.

In the case of adding a chiral dopant, the dye compound-containing liquid crystal composition has a helical pitch (p) of preferably 2 to 30 µm, preferably 5 to 20 µm.

For the helical pitch (p), a liquid crystal composition including a predetermined amount of chiral dopant is injected into a wedge liquid crystal cell including two substrates, having a cell thickness gradually changing, and rubbed antiparallel; the helical pitch (p) can be calculated from the inclination angle θ of the wedge liquid crystal cell (the inclination of the upper substrate) and the disclination line intervals L of the wedge liquid crystal cell measured using a length measuring machine or the like and p=2×L×tan θ.

The d/p value, which is a relation between the helical pitch (p) and the cell thickness (d), is preferably 0.1 to 2.2, preferably 0.5 to 1.5.

Specifically, the d/p value, which is the relation between the helical pitch (p) and the cell thickness (d), is preferably adjusted so as to be optimal in accordance with the twisted angle.

The optimal d/p value is in a range where alignment defects such as a reverse twist domain and a stripe domain do not occur.

Domains are preferably observed, for example, visually or microscopically and adjustments are preferably performed so as not to cause alignment defects.

In the device, the dye compound-containing liquid crystal composition preferably has a pretilt angle of 0.1 to 10°, preferably 0.5 to 5°.

The pretilt angle can be measured using an OPTIPRO manufactured by SHINTECH, Inc.

The spacing between the substrates (cell thickness) is preferably 1 to 100 µm, preferably 1.5 to 30 µm, preferably 5 to 20 µm.

The spacing between the substrates can be adjusted using a spacer.

Examples of the spacer include glass particles, plastic particles, alumina particles, and photoresist materials.

A device according to the present invention may include, from the viewpoint of suppressing deterioration due to ultraviolet rays, an ultraviolet filtering film.

For example, an ultraviolet (UV) filtering film that filters off light at wavelengths of 400 nm or less may be disposed on or bonded to the device.

For a device according to the present invention, a device may be used as a monolayer or a plurality of devices may be stacked and used as two layers or three or more layers.

In the case of using a plurality of devices stacked, from the viewpoint of improving the contrast, devices having been subjected to antiparallel alignment treatment are preferably stacked such that the alignment treatment directions are orthogonal to each other at 90°.

The device can be produced in the following manner.

For example, on a substrate including a first transparent electrode layer, a sealant such as an epoxy-based thermosetting composition is applied except for an injection port; the substrate is bonded to a substrate including a second transparent electrode layer; the substrates are subsequently heated to thermally cure the sealant, to thereby produce an empty cell.

Subsequently, in the cell, the dye compound-containing liquid crystal composition is sandwiched between the two substrates by, for example, the ordinary vacuum injection method or ODF method, to thereby produce a liquid crystal device.

In the case of further improving the contrast, in the device, an optical film such as a polarization axis may be further disposed at a predetermined angle.

EXAMPLES

Hereinafter, the present invention will be described further in detail with reference to Examples; however, the present invention is not limited to the following Examples at all.

The compositions of Examples and Comparative Examples below contain compounds in ratios in Tables and the contents are described in "mass %".

The compounds are described using the following abbreviations. Note that compounds that can have the cis form or the trans form have the trans form unless otherwise specified.

<Cyclic Structure>

[Chem. 80]

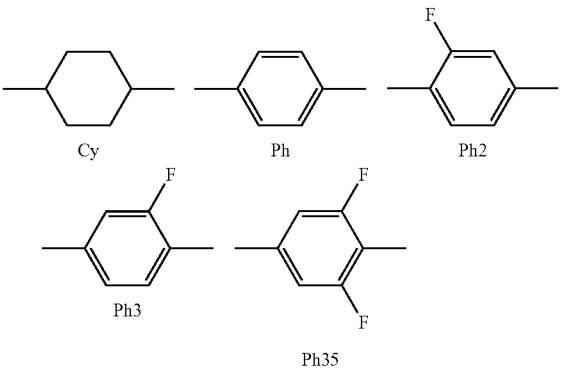

<Terminal Structure>

TABLE 1

| Abbreviation | Chemical structure |
| --- | --- |
| -n | —$C_nH_{2n+1}$ |
| n- | $C_nH_{2n+1}$— |
| —On | —$OC_nH_{2n+1}$ |
| nO— | $C_nH_{2n+1}$O— |
| —F | —F |
| —CN | —CN |
| —V | —CH=$CH_2$ |
| V— | $CH_2$=CH— |
| —2V | —$CH_2$—$CH_2$—CH=$CH_2$ |
| V2— | $CH_2$=CH—$CH_2$—$CH_2$— |
| —V1 | —CH=CH—$CH_3$ |
| 1V— | $CH_3$—CH=CH— |

(Note that n's in the Table are natural numbers.)
<Linking Structure>

TABLE 2

| Abbreviation | Chemical structure |
| --- | --- |
| — | single bond |
| -n- | —$C_nH_{2n}$— |
| -E1- | —C(=O)—O— |
| -E2- | —O—C(=O)— |

<Dye Compound>
SI-426: dichroic dye compound (azo-based) that takes on red coloration and has a maximum absorption wavelength of 414 nm SI-486: dichroic dye compound (azo-based) that takes on yellow coloration and has a maximum absorption wavelength of 513 nm G-472: dichroic dye compound (azo-based) that takes on blue coloration and has a maximum absorption wavelength of 636 nm <Antioxidant>

IRGANOX1076: hindered phenol-based antioxidant

<Ultraviolet (UV) Absorbent>

KEMISORB71: benzotriazole-based compound

<Properties of Liquid Crystal Compositions Used for Dye Compound-Containing Liquid Crystal Compositions>

For the liquid crystal compositions used for the dye compound-containing liquid crystal compositions, the following property values were measured.

$T_{NI}$ (° C.): temperature (upper limit temperature) of transition of such a liquid crystal composition from the nematic phase to the isotropic phase $T \rightarrow_N$ (° C.): temperature (lower limit temperature) of transition of the liquid crystal composition from another phase to the nematic phase Δn: refractive index anisotropy of the liquid crystal composition at 25° C. and at 589 nm $n_e$: long-axis-direction refractive index of liquid crystal molecules of the liquid crystal composition at 25° C. and at 589 nm $n_o$: short-axis-direction refractive index of liquid crystal molecules of the liquid crystal composition at 25° C. and at 589 nm Δε: dielectric anisotropy of the liquid crystal composition at 25° C.

$\varepsilon_\parallel$: long-axis-direction dielectric constant of liquid crystal molecules of the liquid crystal composition at 25° C.

$\varepsilon_\perp$: short-axis-direction dielectric constant of liquid crystal molecules of the liquid crystal composition at 25° C.

$\gamma_1$ (mPa·s): rotational viscosity at 25° C.

$K_{11}$ (pN): elastic constant $K_{11}$ of the liquid crystal composition at 25° C.

$K_{22}$ (pN): elastic constant $K_{22}$ of the liquid crystal composition at 25° C.

$K_{33}$ (pN): elastic constant $K_{33}$ of the liquid crystal composition at 25° C.

Examples 1 to 18 and Comparative Examples 1 to 2

<Adjustment Preparation of Liquid Crystal Compositions Used for Dye Compound-Containing Liquid Crystal Compositions>

As described in Table 1, the liquid crystal compounds were mixed in the ratios, to thereby prepare liquid crystal compositions LC-1 to LC-11 used for dye compound-containing liquid crystal compositions and property values thereof were measured. The results will be described in Tables 3 and 4.

TABLE 3

| Liquid crystal compound | LC-1 | LC-2 | LC-3 | LC-4 | LC-5 | LC-6 | LC-7 | LC-8 | LC-9 | LC-10 | LC-11 |
|---|---|---|---|---|---|---|---|---|---|---|---|
| V2-Cy-Cy-Ph-1 | | | | 15 | | | | | | | |
| V-Cy-Cy-Ph-1 | 15 | 15 | 20 | | 15 | 15 | 15 | 15 | 15 | 15 | |
| 3-Cy-Cy-Ph3-F | 14 | 14 | 15 | 14 | 14 | | 10 | 14 | 14 | | 14 |
| V-Cy-Cy-Ph3-F | | | | | | | 4 | | | | |
| V2-Cy-Cy-Ph3-F | | | | | | 14 | | | | | |
| 3-Cy-Ph-Ph35-F | 15 | 15 | 15 | 12 | | 15 | 15 | | 15 | 15 | 15 |
| 2-Ph-Ph3-Ph35-F | 8 | | 5 | 11 | 8 | 8 | 8 | | 8 | 8 | 8 |
| 3-Cy-Ph3-Ph35-F | | | | | 15 | | | | | | |
| 3-Cy-Ph-O1 | | 15 | 16 | 12 | | | | | | | |
| 3-Cy-Ph-O2 | 12 | 12 | 16 | | 12 | 12 | 12 | 12 | | 12 | 12 |
| 3-Cy-Ph35-CN | | | | | | | | 10 | | | |
| 5-Cy-E1-Ph3-F | | 8 | | | | | | | | | |
| 3-Cy-Cy-E1-Ph3-F | 5 | 5 | | 5 | 5 | 5 | | 5 | 5 | 5 | 5 |
| 3-Cy-2-Cy-E1-Ph3-F | | | | | | | | 7 | | 5 | |
| 4-Cy-2-Cy-E1-Ph3-F | | | | | | | | 6 | | 5 | |
| 2-Cy-Cy-Ph-Ph3-F | 4 | 4 | | 4 | 4 | 4 | 4 | 4 | 4 | 4 | 4 |
| 3-Cy-Cy-Ph-Ph3-F | 4 | 4 | | 4 | 4 | 4 | 4 | 4 | 4 | 4 | 4 |
| 3-Cy-Cy-V | 15 | | | | 15 | 15 | | 15 | 27 | 15 | 15 |
| 3-Cy-Cy-Ph-1 | | | | | | | 5 | | | 4 | |
| 3-Cy-Cy-Ph-3 | | | | | | | | | | | 7 |
| 3-Cy-Ph-Ph-1 | | | | 5 | | | | | | | 8 |
| 3-Cy-Cy-E1-Ph-Cy-2 | 4 | 4 | 4 | 4 | 4 | 4 | 4 | 4 | 4 | 4 | 4 |
| 3-Cy-Cy-E1-Ph-Cy-4 | 4 | 4 | 4 | 4 | 4 | 4 | 4 | 4 | 4 | 4 | 4 |
| 3-Cy-Cy-2 | | | | | 15 | | | | | | |
| 3-Cy-Cy-V1 | | | | | | | | 15 | | | |
| Total (mass %) | 100 | 100 | 100 | 100 | 100 | 100 | 100 | 100 | 100 | 100 | 100 |

TABLE 4

| Property value | LC-1 | LC-2 | LC-3 | LC-4 | LC-5 | LC-6 | LC-7 | LC-8 | LC-9 | LC-10 | LC-11 |
|---|---|---|---|---|---|---|---|---|---|---|---|
| $T_{NI}$ (° C.) | 118.4 | 106.4 | 103.0 | 111.5 | 114.8 | 118.7 | 127.8 | 116.0 | 121.7 | 122.4 | 118.3 |
| $T \rightarrow_N$ (° C.) | G-49 | G-55 | G-54 | G-53 | G-55 | G-51 | G-41 | G-51 | G-49 | G-51 | G-40 |
| Δn | 0.110 | 0.102 | 0.111 | 0.108 | 0.107 | 0.110 | 0.114 | 0.090 | 0.104 | 0.109 | 0.115 |
| $n_e$ | 1.602 | 1.594 | 1.610 | 1.604 | 1.601 | 1.606 | 1.610 | 1.579 | 1.597 | 1.604 | 1.611 |
| $n_o$ | 1.492 | 1.492 | 1.499 | 1.496 | 1.494 | 1.496 | 1.496 | 1.489 | 1.493 | 1.495 | 1.496 |
| Δε | 4.9 | 3.8 | 3.4 | 4.9 | 5.3 | 4.7 | 4.6 | 5.4 | 4.9 | 4.7 | 4.9 |
| $\varepsilon_\parallel$ | 8.1 | 7.2 | 6.6 | 8.2 | 8.7 | 7.9 | 7.7 | 9.0 | 7.9 | 7.9 | 8.1 |
| $\varepsilon_\perp$ | 3.2 | 3.4 | 3.2 | 3.3 | 3.4 | 3.2 | 3.0 | 3.7 | 3.0 | 3.2 | 3.2 |

TABLE 4-continued

| Property value | LC-1 | LC-2 | LC-3 | LC-4 | LC-5 | LC-6 | LC-7 | LC-8 | LC-9 | LC-10 | LC-11 |
|---|---|---|---|---|---|---|---|---|---|---|---|
| $\gamma_1$ (mPa·s) | 139 | 145 | 133 | 127 | 136 | 134 | 161 | 139 | 123 | 155 | 136 |
| $K_{11}$ (pN) | 14.7 | 12.9 | 14.1 | 13.3 | 13.8 | 14.6 | 17.3 | 13.6 | 14.5 | 15.7 | 15.6 |
| $K_{22}$ (pN) | 8.6 | 7.7 | 7.9 | 7.6 | 8.1 | 8.1 | 9.5 | 8.0 | 8.7 | 8.7 | 8.4 |
| $K_{33}$ (pN) | 19.5 | 18.0 | 17.2 | 16.8 | 18.9 | 19.6 | 21.4 | 19.4 | 19.6 | 19.6 | 17.7 |

<Production of Devices, Light Resistance Test, and Solubility Test>

As will be described in Tables 5 and 6, LC1 to 11 were mixed with dye compounds, antioxidants, and a chiral dopant to achieve dissolution, to thereby prepare dye compound-containing liquid crystal compositions. Subsequently, two 2 cm×2 cm glass substrates including an ITO electrode and a homogeneous alignment film (AL1051) on the ITO electrode were used such that the ITO electrode layers were disposed inside of the cell and plastic particles were used to adjust the cell thickness to 10 μm, to produce the cell having an injection port. To such cells, the dye compound-containing liquid crystal compositions were injected and the injection ports were sealed with a sealing material, to thereby produce devices. The produced devices were subjected to (light resistance test) and (solubility test). The results will be described in Tables 5 and 6.

Note that, in Tables 5 and 6, the amounts of the dye compounds, the antioxidants, and the chiral dopant added (parts by mass) are the amounts of them added relative to 100 parts by mass of the liquid crystal compositions.

(Solubility Test)

The produced devices were stored in a thermostat at −25° C. and whether or not deposition occurred was visually observed at intervals of 48 hours over 500 hours.

The evaluation grades are as follows.

A: no deposition was observed until after a lapse of 500 hours

B: deposition was observed after a lapse of 250 hours to less than 500 hours

C: deposition was observed after a lapse of 0 hours to less than 250 hours (Light Resistance Test)

The produced devices were irradiated with, using a "SUNTEST" from ATLAS under a condition of an output of 760 W, light having an illuminance of 100,000 Lux for 500 hours through an UV filtering film that filters off light having wavelengths of 400 nm or less, and changes in the coloration (degrees of deterioration) were visually observed.

The evaluation grades are as follows.

A: no changes in the coloration were observed until after a lapse of 500 hours

B: a change in the coloration was observed after a lapse of 250 hours to less than 500 hours C: a change in the coloration was observed after a lapse of 0 hours to less than 250 hours

TABLE 5

| | | Example 1 | Example 2 | Example 3 | Example 4 | Example 5 | Example 6 |
|---|---|---|---|---|---|---|---|
| Liquid crystal composition | | LC-1 | LC-2 | LC-3 | LC-4 | LC-5 | LC-6 |
| Dye compound | SI-426 | 1.0 | 1.0 | 1.0 | 1.0 | 1.0 | 1.0 |
| | SI-486 | 1.0 | 1.0 | 1.0 | 1.0 | 1.0 | 1.0 |
| | G-472 | 2.0 | 2.0 | 2.0 | 2.0 | 2.0 | 2.0 |
| Specification of device | Twist (*) | 0 | 0 | 0 | 0 | 0 | 0 |
| | Helical pitch (μm) | — | — | — | — | — | — |
| | d/p | — | — | — | — | — | — |
| | Pretilt angle (*) | 1.0 | 1.0 | 1.0 | 1.0 | 1.0 | 1.0 |
| Light resistance test | | A | A | A | A | A | A |
| Solubility test | | A | A | A | A | A | A |

| | | Example 7 | Example 8 | Example 9 | Comparative Example 1 | Comparative Example 2 |
|---|---|---|---|---|---|---|
| Liquid crystal composition | | LC-7 | LC-8 | LC-9 | LC-10 | LC-11 |
| Dye compound | SI-426 | 1.0 | 1.0 | 1.0 | 1.0 | 1.0 |
| | SI-486 | 1.0 | 1.0 | 1.0 | 1.0 | 1.0 |
| | G-472 | 2.0 | 2.0 | 2.0 | 2.0 | 2.0 |
| Specification of device | Twist (*) | 0 | 0 | 0 | 0 | 0 |
| | Helical pitch (μm) | — | — | — | — | — |
| | d/p | — | — | — | — | — |
| | Pretilt angle (*) | 1.0 | 1.0 | 1.0 | 1.0 | 1.0 |
| Light resistance test | | A | B | B | C | A |
| Solubility test | | A | A | A | A | C |

TABLE 6

|  |  | Example 10 | Example 11 | Example 12 | Example 13 | Example 14 | Example 15 | Example 16 | Example 17 | Example 18 |
|---|---|---|---|---|---|---|---|---|---|---|
| Liquid crystal composition | | LC-1 | LC-2 | LC-3 | LC-4 | LC-5 | LC-6 | LC-7 | LC-8 | LC-9 |
| Dye compound | SI-426 | 1.0 | 1.0 | 1.0 | 1.0 | 1.0 | 1.0 | 1.0 | 1.0 | 1.0 |
| | SI-486 | 1.0 | 1.0 | 1.0 | 1.0 | 1.0 | 1.0 | 1.0 | 1.0 | 1.0 |
| | G-472 | 2.0 | 2.0 | 2.0 | 2.0 | 2.0 | 2.0 | 2.0 | 2.0 | 2.0 |
| Antioxidant | IRGANOX1076 | 0.1 | 0.1 | 0.1 | 0.1 | 0.1 | 0.1 | 0.1 | 0.1 | 0.1 |
| | KEMISORB71 | 0.2 | 0.2 | 0.2 | 0.2 | 0.2 | 0.2 | 0.2 | 0.2 | 0.2 |
| Chiral dopant | Chiral S-811 | 0.8 | 0.8 | 0.8 | 0.8 | 0.8 | 0.8 | 0.8 | 0.8 | 0.8 |
| Specification of device | Twist (*) | 360 | 360 | 360 | 360 | 360 | 360 | 360 | 360 | 360 |
| | Helical pitch (μm) | 10 | 10 | 10 | 10 | 10 | 10 | 10 | 10 | 10 |
| | d/p | 1.0 | 1.0 | 1.0 | 1.0 | 1.0 | 1.0 | 1.0 | 1.0 | 1.0 |
| | Pretilt angle (*) | 1.0 | 1.0 | 1.0 | 1.0 | 1.0 | 1.0 | 1.0 | 1.0 | 1.0 |
| Light resistance test | | A | A | A | A | A | A | A | B | B |
| Solubility test | | A | A | A | A | A | A | A | A | A |

Examples 1 to 9 and Comparative Examples 1 to 2 have demonstrated that use of a combination of one or two or more predetermined alkenyl compounds and a compound including a predetermined difluoro structure provides a device that has high light resistance and has high solubility.

In addition, Examples 10 to 18 have demonstrated that the use even in combination with antioxidants and a chiral dopant also provides similar advantages.

Furthermore, Examples 1 to 7, Examples 8 to 9, Examples 10 to 16, and Examples 17 to 18 have demonstrated that a combination of, in addition to one or two or more predetermined alkenyl compounds and a compound including a predetermined difluoro structure, one or two or more compounds represented by the general formula (iii) and including a trifluoro structure and one or two or more compounds including a cyclohexane ring and a benzene ring and represented by the following general formula (iv) provides higher light resistance.

INDUSTRIAL APPLICABILITY

A liquid crystal composition according to the present invention can be applied to devices, in particular, photochromic devices.

The invention claimed is:

1. A dye compound-containing liquid crystal composition comprising:

one or two or more compounds represented by structural formulas (i-1.1) to (i-1.8) below:

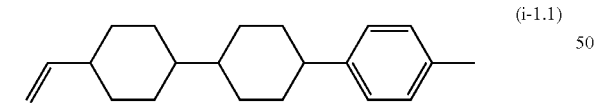
(i-1.1)

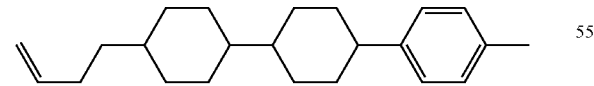
(i-1.2)

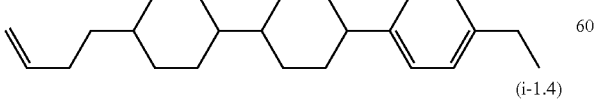
(i-1.3)

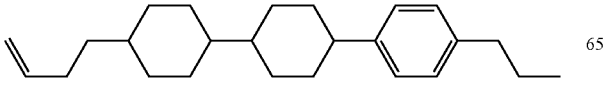
(i-1.4)

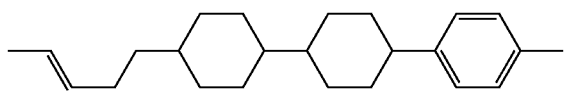
(i-1.5)

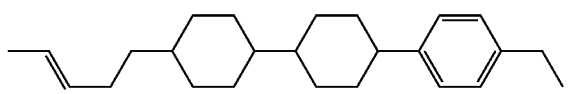
(i-1.6)

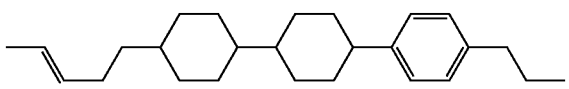
(i-1.7)

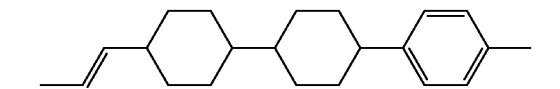
(i-1.8)

one or two or more compounds represented by structural formulas (ii-1.1) to (ii-1.4) below:

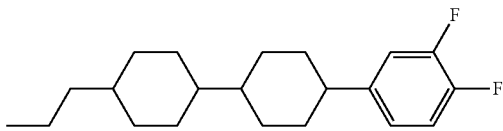
(ii-1.1)

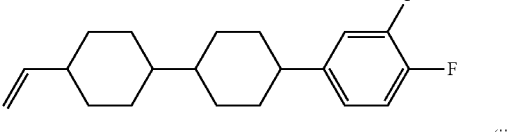
(ii-1.2)

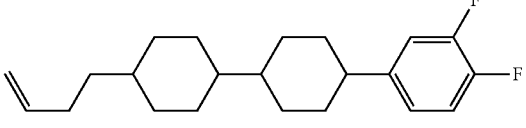
(ii-1.3)

-continued (ii-1.4)

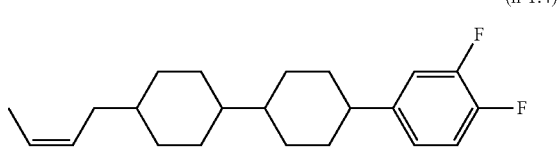

one or two or more compounds represented by a general formula (iv) below:

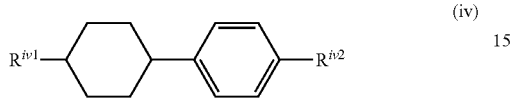

(iv)

in the general formula (iv),
$R^{iv1}$ and $R^{iv2}$ each independently represent an alkyl group having 1 to 20 carbon atoms,
in the alkyl group, one or two or more —CH$_2$— may each independently be substituted with —O— and/or —CO—,
in the alkyl group, one or two or more —CH$_2$—CH$_2$— may each independently be substituted with —CH=CH— and/or —C≡C—, and
in the alkyl group, one or two or more hydrogen atoms may each independently be substituted with a halogen atom,
with the proviso that no direct bond between an oxygen atom and an oxygen atom is formed; and
one or two or more dye compounds,
a total content of the compounds represented by the structural formulas (i-1.1) to (i-1.8) relative to 100 mass % of the dye compound-containing liquid crystal composition is 10 to 30 mass %,
a total content of the compounds represented by the structural formulas (ii-1.1) to (ii-1.4) relative to 100 mass % of the dye compound-containing liquid crystal composition is 10 to 20 mass %,
a total content of the compounds represented by the general formula (iv) relative to 100 mass % of the dye compound-containing liquid crystal composition is 12 mass % or more.

2. The dye compound-containing liquid crystal composition according to claim 1, further comprising:
one or two or more compounds represented by a general formula (iii) below,

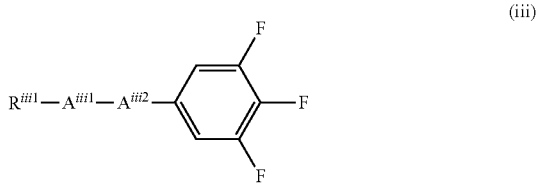

(iii)

in the general formula (iii),
$R^{iii1}$ represents an alkyl group having 1 to 20 carbon atoms,
in the alkyl group, one or two or more —CH$_2$— may each independently be substituted with —O— and/or —CO—, in the alkyl group, one or two or more —CH$_2$—CH$_2$— may each independently be substituted with —CH=CH— and/or —C≡C—,
in the alkyl group, one or two or more hydrogen atoms may each independently be substituted with a halogen atom,
with the proviso that no direct bond between an oxygen atom and an oxygen atom is formed,
$A^{iii1}$ and $A^{iii2}$ each independently represent a group selected from the group consisting of a group (a) and a group (b) below:
(a) a 1,4-cyclohexylene group (in this group, one —CH$_2$— or non-adjacent two or more —CH$_2$— may be replaced by —O— and/or —S—), and
(b) a 1,4-phenylene group (in this group, one —CH= or non-adjacent two or more —CH= may be replaced by —N=), and
in $A^{iii1}$ and $A^{iii2}$ above, one or two or more hydrogen atoms may each independently be substituted with a halogen atom.

3. The dye compound-containing liquid crystal composition according to claim 1, further comprising:
one or two or more compounds represented by a general formula (v) below:

(v)

in the general formula (v),
$R^{v1}$ represents an alkyl group having 1 to 20 carbon atoms,
in the alkyl group, one or two or more —CH$_2$— may each independently be substituted with —O— and/or —CO—,
in the alkyl group, one or two or more —CH$_2$—CH$_2$— may each independently be substituted with —CH=CH— and/or —C≡C—,
in the alkyl group, one or two or more hydrogen atoms may each independently be substituted with a halogen atom,
with the proviso that no direct bond between an oxygen atom and an oxygen atom is formed,
$R^{v2}$ represents a halogen atom, —CN, —OCN, or —C≡CCN,
$A^{v1}$ and $A^{v2}$ each independently represent a group selected from the group consisting of a group (a), a group (b), and a group (c) below:
(a) a 1,4-cyclohexylene group (in this group, one —CH$_2$— or non-adjacent two or more —CH$_2$— may be replaced by —O— and/or —S—),
(b) a 1,4-phenylene group (in this group, one —CH= or non-adjacent two or more —CH= may be replaced by —N=), and
(c) a naphthalene-2,6-diyl group or decahydronaphthalene-2,6-diyl group (in the naphthalene-2,6-diyl group, one —CH= or non-adjacent two or more —CH= may be substituted with —N=),
in $A^{v1}$ and $A^{v2}$ above, one or two or more hydrogen atoms may each independently be substituted with a halogen atom,
$Z^{v1}$ represents a single bond or an alkylene group having 1 to 20 carbon atoms,
in the alkylene group, one or two or more —CH$_2$— may each independently be substituted with —O—, —CH(CH$_3$)—, —CO—, and/or —CF$_2$—, in the alkylene group, one or two or more —CH₂—CH₂— may each independently be substituted with —CH=CH—, —CF=CH—, —CH=CF—, —CF=CF—, —CH=C(CH₃)—, —C(CH₃)=CH—, —CH=N—, —N=CH—, —N=N—, and/or —C≡C—, with the proviso that no direct bond between an oxygen atom and an oxygen atom is formed, $n^{v1}$ represents an integer of 1 to 3, and when a plurality of $A^{v2}$ and $Z^{v1}$ are present, they may be the same or different, with the proviso that compounds represented by the structural formulas (ii-1.1) to (ii-1.4) and the general formula (iii) are excluded.

4. The dye compound-containing liquid crystal composition according to claim 1, further comprising:

one or two or more compounds represented by a general formula (vi) below:

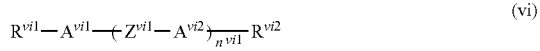

(vi)

in the general formula (vi), $R^{vi1}$ and $R^{vi2}$ each independently represent an alkyl group having 1 to 20 carbon atoms, in the alkyl group, one or two or more —CH₂— may each independently be substituted with —O— and/or —CO—, in the alkyl group, one or two or more —CH₂—CH₂— may each independently be substituted with —CH=CH— and/or —C≡C—, no direct bond between an oxygen atom and an oxygen atom is formed, $A^{vi1}$ and $A^{vi2}$ each independently represent a group selected from the group consisting of a group (a), a group (b), and a group (c) below:

(a) a 1,4-cyclohexylene group (in this group, one —CH₂— or non-adjacent two or more —CH₂— may be replaced by —O— and/or —S—), (b) a 1,4-phenylene group (in this group, one —CH= or non-adjacent two or more —CH= may be replaced by —N=), and (c) a naphthalene-2,6-diyl group or decahydronaphthalene-2,6-diyl group (in the naphthalene-2,6-diyl group, one —CH= or non-adjacent two or more —CH= may be substituted with —N=), in $A^{vi1}$ and $A^{vi2}$ above, one or two or more hydrogen atoms may each independently be substituted with an alkyl group having 1 to 6 carbon atoms, $Z^{vi1}$ represents a single bond or an alkylene group having 1 to 20 carbon atoms, in the alkylene group, one or two or more —CH₂— may each independently be substituted with —O—, —CH(CH₃)—, —CO—, and/or —CF₂—, in the alkylene group, one or two or more —CH₂—CH₂— may each independently be substituted with —CH=CH—, —CF=CH—, —CH=CF—, —CF=CF—, —CH=C(CH₃)—, —C(CH₃)=CH—, —CH=N—, —N=CH—, —N=N—, and/or —C≡C—, with the proviso that no direct bond between an oxygen atom and an oxygen atom is formed, $n^{vi1}$ represents an integer of 1 to 3, and when a plurality of $A^{vi2}$ and $Z^{vi1}$ are present, they may be the same or different, with the proviso that compounds represented by the structural formulas (i-1.1) to (i-1.8) and the general and formula (iv) are excluded.

5. The dye compound-containing liquid crystal composition according to claim 1, wherein the dye compounds have a maximum absorption in a range of 350 to 700 nm.

6. The dye compound-containing liquid crystal composition according to claim 5, wherein the dye compounds are dichroic dye compounds.

7. The dye compound-containing liquid crystal composition according to claim 1, further comprising a chiral dopant.

8. A device comprising the dye compound-containing liquid crystal composition according to claim 1.

9. The device according to claim 8, wherein the device is a photochromic device.

* * * * *